United States Patent
Akaike et al.

(10) Patent No.: US 8,209,565 B2
(45) Date of Patent: Jun. 26, 2012

(54) DATA PROCESSING DEVICE AND BUS ACCESS CONTROL METHOD THEREIN

(75) Inventors: Yukihiko Akaike, Kanagawa (JP); Hitoshi Suzuki, Kanagawa (JP); Junichi Sato, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 327 days.

(21) Appl. No.: 12/314,493

(22) Filed: Dec. 11, 2008

(65) Prior Publication Data

US 2009/0172231 A1 Jul. 2, 2009

(30) Foreign Application Priority Data

Dec. 27, 2007 (JP) ................................ 2007-337549

(51) Int. Cl.
*G06F 11/00* (2006.01)
(52) U.S. Cl. ............. 714/43; 714/44; 710/107; 710/260
(58) Field of Classification Search ............... 714/42–44, 714/54; 710/200
See application file for complete search history.

(56) References Cited

U.S. PATENT DOCUMENTS

| | | | | |
|---|---|---|---|---|
| 4,870,704 A * | 9/1989 | Matelan et al. | ............... | 710/120 |
| 5,596,717 A * | 1/1997 | Marshall, Jr. | ................... | 714/53 |
| 6,272,651 B1 * | 8/2001 | Chin et al. | ....................... | 714/43 |
| 6,463,488 B1 * | 10/2002 | San Juan | ....................... | 710/107 |
| 6,470,407 B1 * | 10/2002 | Losi | .............................. | 710/264 |
| 6,694,457 B2 * | 2/2004 | McKee | .......................... | 714/38 |
| 6,745,307 B2 * | 6/2004 | McKee | .......................... | 711/163 |
| 6,948,100 B1 * | 9/2005 | Sekiguchi et al. | .............. | 714/43 |
| 6,954,819 B2 * | 10/2005 | Ng | ................................ | 710/313 |
| 7,269,759 B2 * | 9/2007 | Biles | ............................... | 714/42 |
| 7,426,662 B2 * | 9/2008 | Sekiguchi et al. | .............. | 714/43 |
| 7,434,264 B2 * | 10/2008 | Moyer et al. | ..................... | 726/28 |
| 7,783,915 B2 * | 8/2010 | Hauf | .............................. | 714/5 |
| 2003/0172221 A1 * | 9/2003 | McNeil | ......................... | 710/305 |
| 2004/0177266 A1 * | 9/2004 | Moyer et al. | ................... | 713/200 |
| 2005/0071722 A1 | 3/2005 | Biles | | |

FOREIGN PATENT DOCUMENTS

| | | |
|---|---|---|
| JP | 9-91210 | 4/1997 |
| JP | 11-312102 (A) | 11/1999 |
| JP | 2003-50712 | 2/2003 |
| JP | 2005-108222 | 4/2005 |

OTHER PUBLICATIONS

Japanese Office Action dated Mar. 21, 2012, with partial English translation.

* cited by examiner

*Primary Examiner* — Robert Beausoliel, Jr.
*Assistant Examiner* — Elmira Mehrmanesh
(74) *Attorney, Agent, or Firm* — McGinn Intellectual Property Law Group, PLLC

(57) ABSTRACT

A data processing device includes a computing circuit that accesses a peripheral device connected to through a internal bus, an internal bus connection circuit that is provided between the computing circuit and the internal bus, and switches an enable and a disable state of an access from the computing circuit to the internal bus, an exception notification controller that outputs an exception occurrence notification signal to the computing circuit based on an error occurred in the peripheral device, and a bus disablement controller that instructs the internal bus connection circuit to disable an access from the computing circuit to the internal bus in accordance with the notification of the exception occurrence notification signal, and instructs the internal bus connection circuit to cancel the disablement of the access in accordance with a start of an exception processing based on the exception occurrence notification signal.

21 Claims, 16 Drawing Sheets

DATA PROCESSING DEVICE AND BUS ACCESS CONTROL METHOD THEREIN

BACKGROUND

1. Field of the Invention

The present invention relates to a data processing device and a bus access control method therein, and more specifically, to a data processing device including an internal bus connecting a computing circuit executing a program and a peripheral device and an internal bus connection circuit disabling an access from the computing circuit to the internal bus when an exception is occurred in the peripheral device, and a bus access control method in the data processing device.

2. Description of Related Art

In data processing devices such as micon, a multi-task processing is carried out, where a plurality of tasks are executed while switching them in time division. Further, the data processing device includes a computing circuit executing a task based on a program and a peripheral device connected to the computing circuit through a bus and executing various processings based on an instruction from the computing circuit. The peripheral device includes a memory, a coprocessor, and so on. The peripheral device may be embedded in the data processing device, or may be an external peripheral device provided outside the data processing device. In such a data processing device, when there is occurred an error (hereinafter referred to as exception) generated in the task to be executed or the peripheral device, the bus may be disabled to prevent tasks that are to be executed later from accessing the peripheral device improperly, so as to prevent the expansion of malfunction due to the exception.

One example of the data processing device including a means of disabling the bus is disclosed in Japanese Unexamined Patent Application Publication No. 2005-108222 (Biles). FIG. 16 shows a block diagram of a data processing device 100 disclosed in Biles. As shown in FIG. 16, the data processing device 100 includes a core 110, a memory 120, a bus 130, peripheral devices 140, and a reset controller 150. Further, the core 100 includes a processor 111, a cache 112, and a bus interface unit 113.

In the data processing device 100, the cache 112 is employed as a memory region in a processing executed in the processor 111. The cache 112 executes parity check of the data. When it is determined that the stored data is corrupted, the cache 112 outputs a corruption signal 151. The corruption signal 151 is transmitted to the bus interface unit 113 and the reset controller 150. The bus interface unit 113 to which the corruption signal 151 is input disables the access from the core 110 to the bus 130, so as to prevent the error from being transferred to the memory 120 and to the peripheral devices 140. The reset controller 150 resets the core 110. As such, it is possible to prevent the error from being transferred to the memory 120 and to the peripheral devices 140 in the data processing device 100.

Further, a method of disabling the connection between the computing circuit and the peripheral device in accordance with the occurrence of the exception is also disclosed in Japanese Unexamined Patent Application Publication No. 2003-50712. Further, a method of stopping the control of the peripheral device by the computing circuit without waiting for the process of the computing circuit when the exception is occurred in the peripheral device is disclosed in Japanese Unexamined Patent Application Publication No. 9-91210.

SUMMARY

The present inventors have found a problem with the above-described disabling the bus, as per as follows. When the exception is occurred in the data processing device, the computing circuit may execute the exception processing based on an exception processing program in a return processing from the exception state. The exception processing may include a processing such as discard of the executed task in addition to the reset processing of the data processing device. Since the exception processing program has a large program capacity, the exception processing program is stored in the memory area connected to the computing circuit by a bus.

In such a case, in the data processing device 100 disclosed in Biles, the access from the computing circuit to the bus is disabled due to the occurrence of the exception; therefore, it is impossible for the computing circuit to read out the exception processing program from the memory. In the data processing device 100, the system is returned from the exception occurrence state by the reset operation. However, the reset operation takes long time for the return operation, which decreases the processing ability of the system. On the other hand, when the data processing device is returned from the exception occurrence state by the exception processing program, it is possible to perform the return operation of the system which is more flexible than the reset operation, which shortens the time required for the return of the system. In summary, although the propagation of abnormal state can be prevented in the data processing device 100 by disabling the bus, the return processing from the exception state having high flexibility cannot be performed by the exception processing program. Therefore, the processing ability of the system decreases.

A first exemplary aspect of an embodiment of the present invention is a data processing device includes a computing circuit that accesses a peripheral device connected to through a internal bus, an internal bus connection circuit that is provided between the computing circuit and the internal bus, and switches an enable and a disable state of an access from the computing circuit to the internal bus, an exception notification controller that outputs an exception occurrence notification signal to the computing circuit based on an error occurred in the peripheral device, and a bus disablement controller that instructs the internal bus connection circuit to disable an access from the computing circuit to the internal bus in accordance with the notification of the exception occurrence notification signal, and instructs the internal bus connection circuit to cancel the disablement of the access from the computing circuit to the internal bus in accordance with a start of an exception processing based on the exception occurrence notification signal.

A second exemplary aspect of an embodiment of the present invention is a method for bus access control of a data processing device includes a internal bus, a computing circuit that accesses a peripheral device connected to through the internal bus, and an internal bus connection circuit that is provided between the computing circuit and the internal bus, and switches an enable and a disable state of an access from the computing circuit to the internal bus, the method for bus access control of the data processing device comprising, disabling an access from the computing circuit to the internal bus based on an access violation in the peripheral device, and canceling the disablement of the access from the computing circuit to the internal bus in accordance with a start of an exception processing in the computing circuit.

According to the data processing device and the bus access control method therein of the present invention, the connection between the computing circuit and the internal bus is disabled based on the exception occurrence in the peripheral device, and the disablement of the connection between the computing circuit and the internal bus is canceled in accordance with the start of the exception processing in the computing circuit. Accordingly, it is possible for the computing circuit to read out the exception program from the memory area connected through the internal bus in the exception processing. Further, it is possible for the computing circuit to access the peripheral device in the exception processing. According to the data processing device and the bus access control method therein of the present invention, it is possible to prevent the propagation of abnormal state by disabling the internal bus in the exception occurrence and to perform the return processing from the exception state having high flexibility using the internal bus in the exception processing.

According to the data processing device and the bus access control method therein of the present invention, it is possible to improve the reliability of the system in the exception occurrence and to realize the return processing with high flexibility in the exception processing.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

The first to fifth exemplary embodiments can be combined as desirable by one of ordinary skill in the art.

First Exemplary Embodiment

Figure 1:
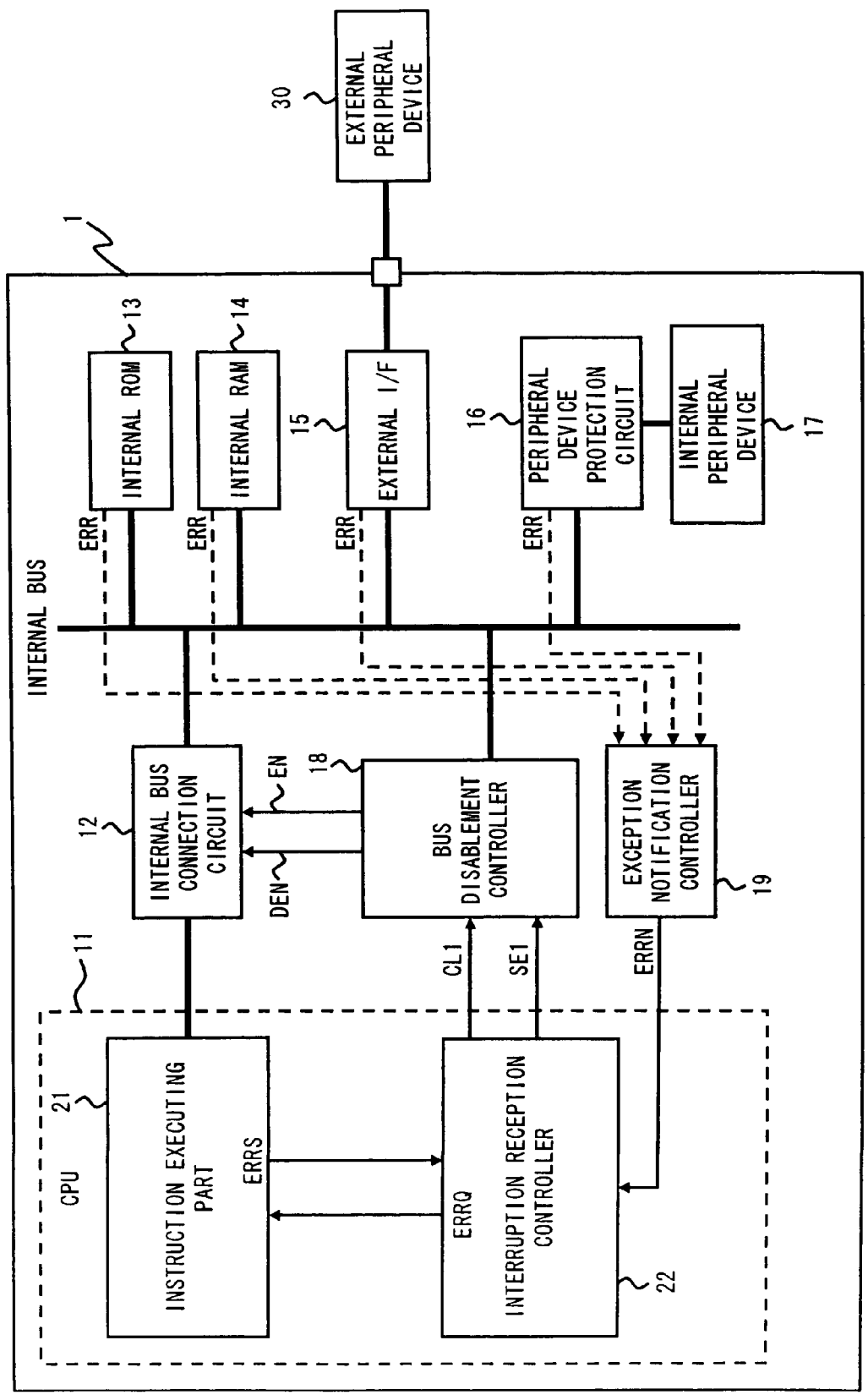
FIG. 1 is a block diagram of a data processing device according to a first exemplary embodiment.

The exemplary embodiments of the present invention will be described with reference to the drawings. FIG. 1 shows a block diagram of a data processing device 1 according to the first exemplary embodiment. As shown in FIG. 1, a data processing device 1 includes a computing circuit (CPU: Central Processing Unit, for example) 11, an internal bus connection circuit 12, an internal ROM (Read Only Memory) 13, an internal RAM (Random Access Memory) 14, an external interface 15, a peripheral device protection circuit 16, an internal peripheral device 17, a bus disablement controller 18, and an exception notification controller 19. Further, an external peripheral device 30 is connected to the data processing device 1 through the external bus interface 15. Note that, in the following description, the peripheral device in the data processing device 1 includes an internal ROM 13, an internal RAM 14, an external interface 15, a peripheral device protection circuit 16, and an internal peripheral device 17.

The CPU 11 executes various tasks based on a program, and executes main information processing in the data processing device 1. The CPU 11 is connected to the peripheral device through an internal bus. The CPU 11 includes an instruction executing part 21 and an interruption reception controller 22.

The instruction executing part 21 reads out the program from the external peripheral device 30 connected through the internal ROM 13, the internal RAM 14, or the external interface 15 through the internal bus connection circuit 12 and the internal bus (this reading operation is called fetch operation) to execute the task based on the program. Further, the instruction executing part 21 accesses the peripheral device through the internal bus connection circuit 12 and the internal bus based on the content of the task which is executed. In the first exemplary embodiment, the instruction executing part 21 executes prefetch operation fetching the instruction to be executed in advance. Note that one task is normally formed of a plurality of instructions. The exception processing executed in the instruction executing part 21 is executed based on an interruption request signal ERRQ output from the interruption reception controller 22. The instruction executing part 21 outputs an exception processing start signal ERRS in accordance with the start of the exception processing.

The interruption reception controller 22 outputs a set signal SE1 to the bus disablement controller 18 and the interruption request signal ERRQ to the instruction executing part 21 based on an exception occurrence notification signal ERRN output from the exception notification controller 19. Further, the interruption reception controller 22 outputs a clear signal CL1 to the bus disablement controller 18 upon receiving the exception processing start signal ERRS notifying that the instruction executing part 21 started the exception processing based on the interruption request signal ERRQ.

The internal bus connection circuit 12 is provided between the CPU 11 and the internal bus. Then the internal bus connection circuit 12 switches an enable state and a disable state of the access from the CPU 11 to the internal bus. This switch operation is executed based on an enable signal EN and a disable signal DEN output from the bus disablement controller 18. More specifically, the internal bus connection circuit 12 allows the access from the CPU 11 to the internal bus during a time at which the enable signal EN is being input. In this case, the CPU 11 can access the internal bus without limitation. On the other hand, the internal bus connection circuit 12 interrupts the access from the CPU 11 to the internal bus during a time at which the disable signal DEN is being input. In this case, the CPU 11 cannot access the internal bus.

The internal ROM 13 is a storage area, where the program employed in the CPU 11 is stored. In the first exemplary embodiment, the internal ROM 13 includes an exception handler area which is referred to by the CPU 11 in start of the exception processing. The exception handler area stores information indicating a branch destination including a program regarding a main routine of the exception processing. The internal RAM 14 is also a storage area, where the program employed in the CPU 11 and intermediate information of the operation executed in the CPU 11 are stored.

The external interface 15 is an interface circuit with the external peripheral device 30 provided outside the data processing device 1. The external interface 15 may include a function converting data format when the data processing device 1 accesses the external peripheral device 30, for example. The peripheral device protection circuit 16 is provided between the internal peripheral device 17 and the internal bus. The peripheral device protection circuit 16 sets a protection range for the internal peripheral device 17 for each task executed in the CPU 11. When the CPU 11 accesses the internal peripheral device 17, the peripheral device protection circuit 16 determines whether the access is within the protection range. When the access is within the protection range, the access is interrupted. The internal peripheral device 17 includes a peripheral function employed by the CPU 11 such as a coprocessor, a timer, a reset controller, for example. These peripheral functions may either be implemented as individual blocks or may be implemented as one functional block.

The bus disablement controller 18 instructs the internal bus connection circuit 12 to disable the access from the CPU 11 to the internal bus in accordance with the notification of the exception occurrence notification signal ERRN, and instructs the internal bus connection circuit 12 to cancel the disablement of the access from the CPU 11 to the internal bus in accordance with the start of the exception processing based on the exception occurrence notification signal ERRN. More specifically, the bus disablement controller 18 outputs the enable signal EN to the internal bus connection circuit 12 based on the set signal SE1 output from the CPU 11 based on the exception occurrence notification signal ERRN to instruct the internal bus connection circuit 12 to disable the access from the CPU 11 to the internal bus. In the same way, the bus disablement controller 18 outputs the disable signal DEN to the internal bus connection circuit 12 based on the clear signal CL1 output from the CPU 11 in accordance with the start of the exception processing in the CPU 11 to instruct the internal bus connection circuit 12 to cancel the disablement of the access from the CPU 11.

The exception notification controller 19 receives the exception occurrence signal ERR from each peripheral device to output the exception occurrence notification signal ERRN to the CPU 11. The exception occurrence notification signal ERRN includes the information of the peripheral device outputting the exception occurrence signal ERR and an exception code indicating the type of the exception occurred in the peripheral device.

Figure 2:
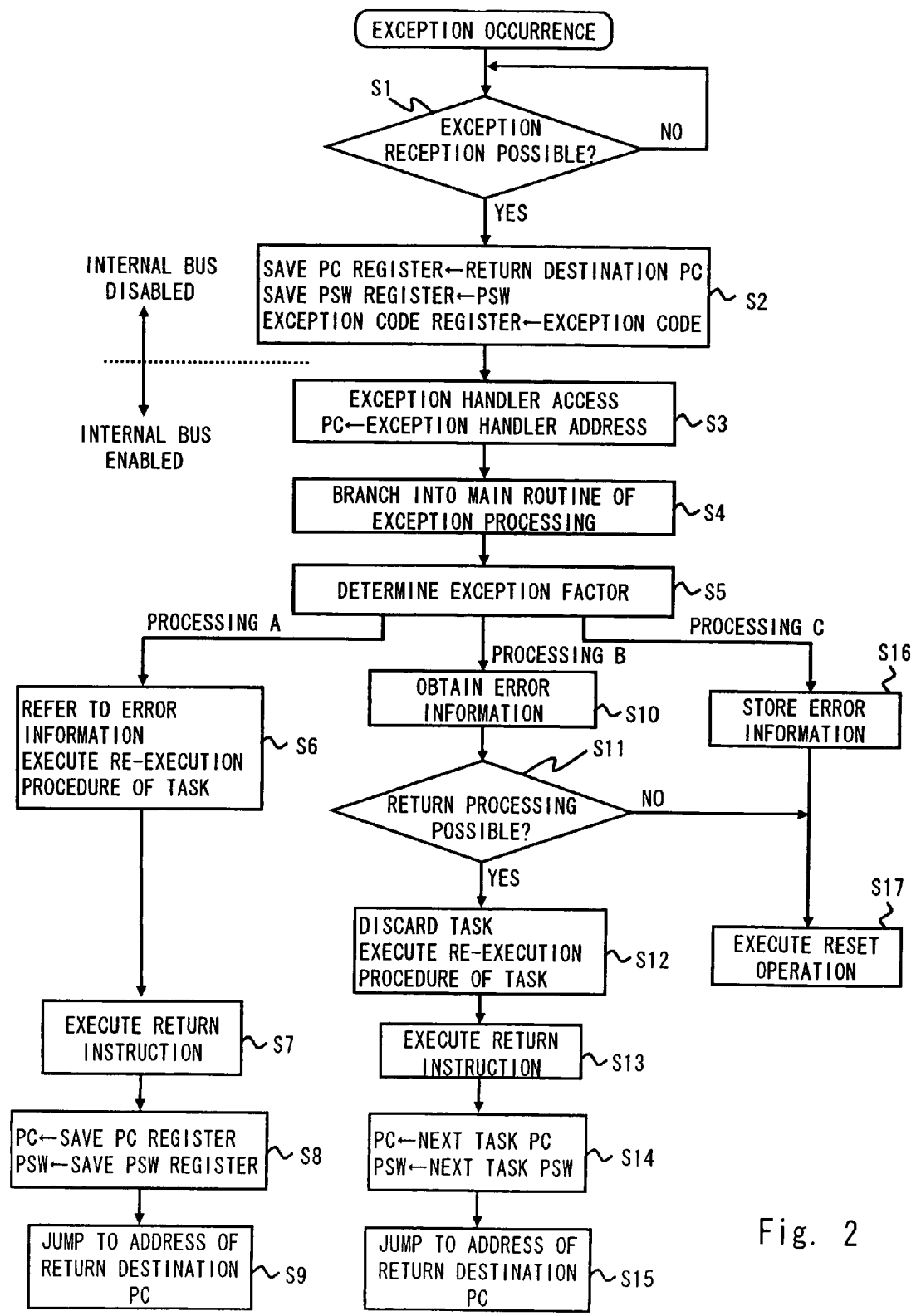
FIG. 2 is a flow chart showing an operation of the data processing device according to the first exemplary embodiment.

In the data processing device 1 according to the first exemplary embodiment, upon occurrence of the exception in the peripheral device, the exception processing program is executed to return the system from the exception state. Now, the return processing executed in the CPU 11 of the data processing device 1 will be described. FIG. 2 shows a flow chart of the return processing executed in the CPU 11. Hereinafter, the return processing will be described with reference to FIG. 2. The return processing described hereinbelow is merely one example of the exception processing, and the return processing can be changed as appropriate depending on the architecture of the system or the design method of the exception processing program.

In the data processing device 1, upon occurrence of the exception in the peripheral device, the exception occurrence notification signal ERRN is output by the exception notification controller 19, and the interruption reception controller 22 outputs the interruption request signal ERRQ. At this time, it is determined whether the instruction executing part 21 is able to receive the exception processing (step S1). When there is an instruction speculatively executed, the instruction executing part 21 starts reception of the exception processing after completion of the processing of the instruction which has already been speculatively executed. Accordingly, when there is an instruction which is speculatively executed, the process goes to the branch of No in step S1, and the reception of the exception processing is suspended until the completion of the instruction. On the other hand, when there is no instruction which is speculatively executed, the process goes to the branch of Yes in step S1, and the exception processing is started.

In step S2, the information of the task which has been executed is saved. More specifically, a program counter of the program of the task which has been executed is saved in a save PC (program counter) register as a return destination PC. Further, a program status word PSW indicating the execution state of the task which has been executed is stored in a save PSW register. Further, an exception code which is output with the interruption request signal ERRQ is stored in an exception code register. At this time, the instruction executing part 21 outputs the processing start signal ERRS. In the data processing device 1, the access from the CPU 11 to the internal bus is disabled by the internal bus connection circuit 12 from when the exception occurrence notification signal ERRN is output from the exception notification controller 19 to when the processing start signal ERRS is output. In summary, the access from the CPU 11 to the internal bus is disabled until when the step S1 and the step S2 are completed. Upon completion of the step S2, the clear signal CL1 is output from the interruption reception controller 22 to the bus disablement controller 18, whereby the disablement of the access to the internal bus is canceled.

Then, the instruction executing part 21 accesses the exception handler area of the internal ROM 13 through the internal bus and the internal bus connection circuit 12 where the disablement is canceled, so as to set an exception handler address in the program counter PC (step S3). Then, the program of the main routine of the exception processing is read out based on the program stored in the exception handler address. Accordingly, the task to be executed is branched into the main routine of the exception processing by the instruction executing part 21 (step S4). In the main routine of the exception processing, the determination of the exception factor is made based on the exception code (step S5). In the first exemplary embodiment, three processings of processing A to processing C are executed according to the seriousness of the exception.

The processing A is performed when a minor exception is occurred. In the processing A, the task which has been executed is continuously executed without performing the processing such as discard of the task. For example, the processing A is performed in a case where, although a rounding is occurred in a calculation result in a calculation in the coprocessor, the following process can be continued judging from the calculation result. In the processing A, the exception code and the error information stored in the peripheral device where the exception is occurred are referred to first to confirm that the processing result has no problem, so as to perform re-execution procedure of the task (step S6). Then, the instruction executing part 21 executes the return instruction (step S7). Then the value of the program counter PC saved in the step S2 is written back in the program counter PC. Further, the value of the program status word PSW saved in the step S2 is written back also in the program status word PSW (step S8). Then, the instruction executing part 21 jumps the processing to the original execution task based on the values of the program counter PC and the program status word PSW (step S9).

The processing B is performed when a moderate exception is occurred, where the system is recovered without performing the reset operation. In the processing B, the system is reset when it is determined that the exception is the major one. For example, the processing B is performed when the result cannot be written in the memory in the task which has been executed and there is an abnormal operation in the task. In such a case, in the processing B, it is determined that there is an abnormality in the task which has been executed and the task is discarded when the information of the memory is not rewritten. When the information of the memory is rewritten and it is difficult to correct the information of the memory, the system can be reset, for example. In the processing B, the exception code and the error information stored in the peripheral device where the exception is occurred are referred to first (step S10). Then, it is determined whether the return processing can be performed based on the seriousness of the exception occurred in the peripheral device (step S11). When it is determined in the step S11 that the exception which is occurred is the major one and the return processing cannot be performed (No in step S11), the reset operation of the system is performed in step S17. On the other hand, when it is determined in the step S11 that the seriousness of the exception which is occurred is not so high and the return processing can be performed (Yes in step S11), the task which has been executed is discarded and a procedure to execute the next task is carried out (step S12). The step S12 is performed by the OS (Operating System), for example. Then, the instruction executing part 21 performs the return instruction (step S13). Then, the value of the program counter PC of the next task is written in the program counter PC. Further, the value of the program status word PSW of the next task is written in the program status word PSW as well (step S14). Then, the instruction executing part 21 jumps the process to the new task based on the values of the program counter PC and the program status word PSW (step S15).

The processing C is performed when a major exception is occurred, where the reset of the system is performed. For example, the processing C is performed when the information is falsely written in the internal RAM in the task which has been executed and the error cannot be corrected. In the processing C, the error information is stored first (step S16). Then, the reset operation of the system is performed to restart the data processing device 1 (step S17).

Figure 3:
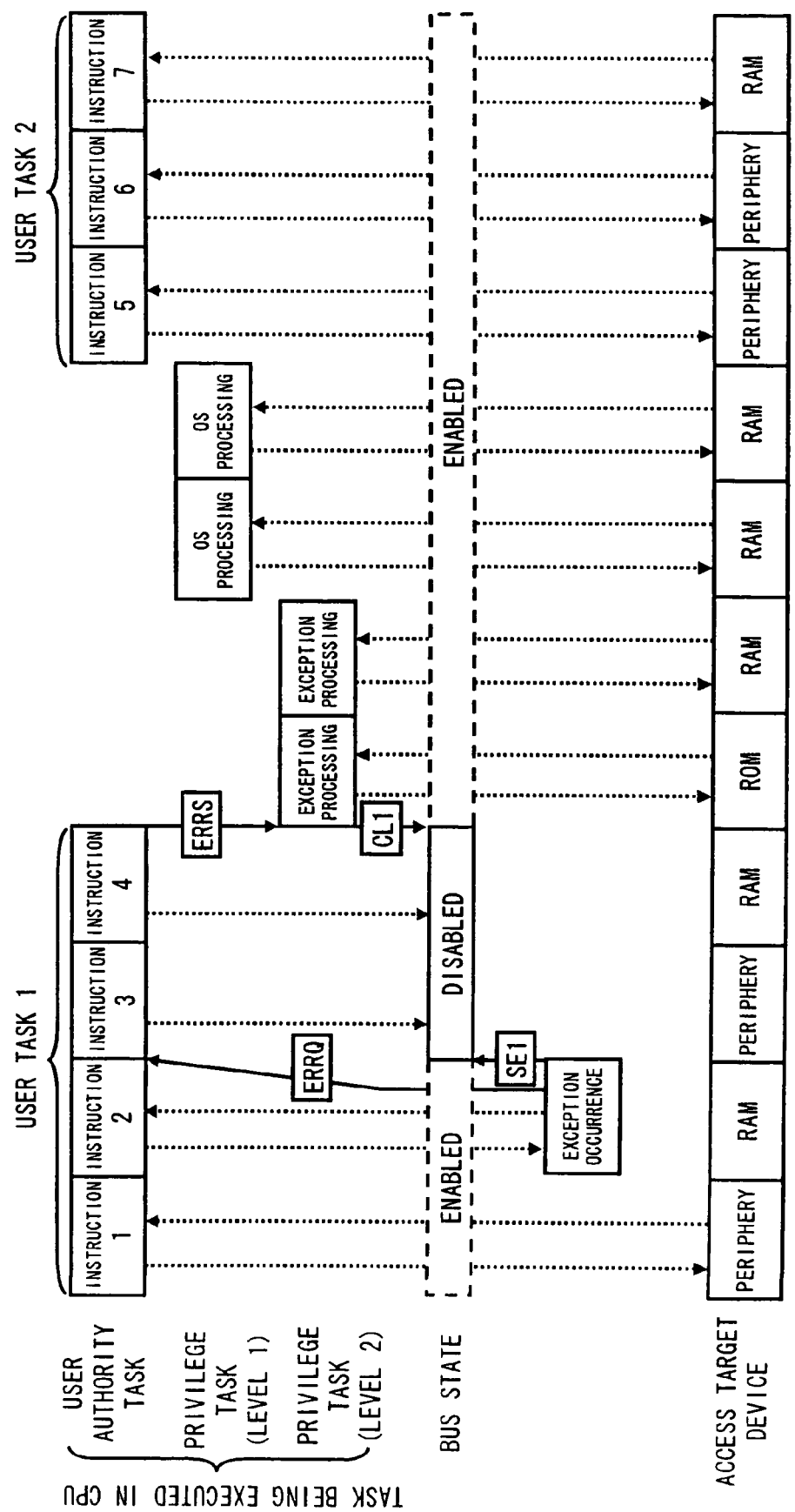
FIG. 3 is a timing chart showing the operation of the data processing device according to the first exemplary embodiment.

FIG. 3 shows a timing chart showing the operation of the data processing device 1. The disablement and the cancel of the disablement of the internal bus in the data processing device 1 will be described with reference to FIG. 3. In the example shown in FIG. 3, user tasks 1 and 2 are executed as a user authority task having the lowest authority level. The task regarding the OS is processed in a level 1 in the lower level side of the privilege level having higher authority than the user authority, and the exception processing is performed in a level 2 in the higher level side of the privilege level. The processing unit of the user task is indicated by instruction. The access target device shown in a label of "periphery" in FIG. 3 is the internal peripheral device 17, a label of "ROM" is the internal ROM 13, and a label of "RAM" is the internal RAM 14. In the example shown in FIG. 3, the timing is shown by the process cycle of the instruction, and the instruction executing part 21 performs the execution of the instruction and the prefetch of the instruction in one process cycle. The example shown in FIG. 3 is of a case where the processing B is occurred shown in FIG. 2.

As shown in FIG. 3, the instruction executing part 21 accesses the internal peripheral device 17 in the instruction 1 of the user task 1, and the instruction 1 is completed properly. Next, the instruction executing part 21 executes the instruction 2. The instruction 2 accesses the internal RAM 14; however, this access is regarded as unauthorized and the internal RAM 14 outputs the exception occurrence signal ERR. In the example of FIG. 3, the internal RAM 14 does not receive this access, and the content of the memory is not rewritten. Upon receiving the exception occurrence signal ERR, the exception notification controller 19 outputs the exception occurrence notification signal ERRN. Upon receiving the exception occurrence notification signal ERRN, the interruption reception controller 22 outputs the interruption request signal ERRQ to the instruction executing part 21. Further, the interruption reception controller 22 outputs the set signal SE1 to the bus disablement controller 18 based on the exception occurrence notification signal ERRN. Then, the bus disablement controller 18 receiving the set signal SE1 outputs the disable signal DEN to the internal bus connection circuit 12, so that the internal bus connection circuit 12 disables the access from the CPU 11 to the internal bus.

The instruction executing part 21 receives the interruption request signal ERRQ at the same time as the completion of the instruction 2. However, since the instructions 3 and 4 have already been executed speculatively, the exception processing based on the interruption request signal ERRQ is suspended until the completion of the instruction 4. Further, the instruction executing part 21 stops the execution of the instruction following the instruction 4 based on the reception of the interruption request signal ERRQ. The instruction 3 is the access to the internal peripheral device 17, and the instruction 4 is the access to the internal RAM 14. However, since the access from the CPU 11 to the internal bus is disabled at the time of execution of the instructions 3 and 4, the access is interrupted by the internal bus connection circuit 12 without being output to the internal bus.

Upon completion of the processing of the instruction 4, the instruction executing part 21 starts the exception processing. The instruction executing part 21 outputs the processing start signal ERRS and the interruption reception controller 22 receiving the processing start signal ERRS outputs the clear signal CL1 in accordance with the start of the exception processing. The bus disablement controller 18 receiving the clear signal CL1 outputs the enable signal EN, and the internal bus connection circuit 12 receiving the enable signal EN cancels the disablement of the access from the CPU 11 to the internal bus. According to this operation, the internal bus is in the enable state, and the instruction executing part 21 accesses the internal ROM 13 to perform the operation after the step S3 in FIG. 2. In the example shown in FIG. 3, the instruction executing part 21 accesses the internal ROM 13 and the internal RAM 14 in the exception processing. Then the instruction executing part 21 moves the task to be executed to the OS and discards the user task 1 to prepare for executing the new user task 2. After that, upon completion of the processing of the OS, the instructions 5 to 7, which are the user task 2, are sequentially executed.

From the above description, the data processing device 1 disables the access from the CPU 11 to the internal bus in accordance with the occurrence of the exception in the peripheral device. Accordingly, it is possible to prevent the expansion of the damage due to the instruction which is speculatively executed in the CPU 11. In summary, in the data processing device 1, even when the access to the internal bus is occurred by the instruction which is speculatively executed following the instruction in which the exception is occurred, the damage is not expanded because of the disablement of the internal bus. Accordingly, it is possible to speculatively execute the instruction in the data processing device 1 without concerning the occurrence of the exception. Thus, according to the data processing device 1, the process performance can be made higher and the reliability in the exception processing can be increased.

Furthermore, the data processing device 1 cancels the disablement of the access from the CPU 11 to the internal bus which is disabled once in accordance with the start of the exception processing. Accordingly, it is possible to read out the exception processing program stored in the storage area connected to the CPU 11 through the internal bus to execute the exception processing. Therefore, it is possible to provide an exception processing program in a place different from the CPU 11 in the data processing device 1. As such, the exception processing can be performed by the exception processing program whose capacity is so large that the program cannot be embedded in the CPU 11. Accordingly, it is possible for the data processing device 1 to perform the exception processing having higher flexibility and highly complicated compared with the reset operation. Further, the return operation other than the reset operation can be performed such as continuation of the task, discard of the task, or execution of the new task by the exception processing program in the case of minor exception. Although the reset operation decreases the process performance of the data processing device since the process time is long, the return operation where the reset operation is not performed hardly decreases the process performance.

Figure 4:
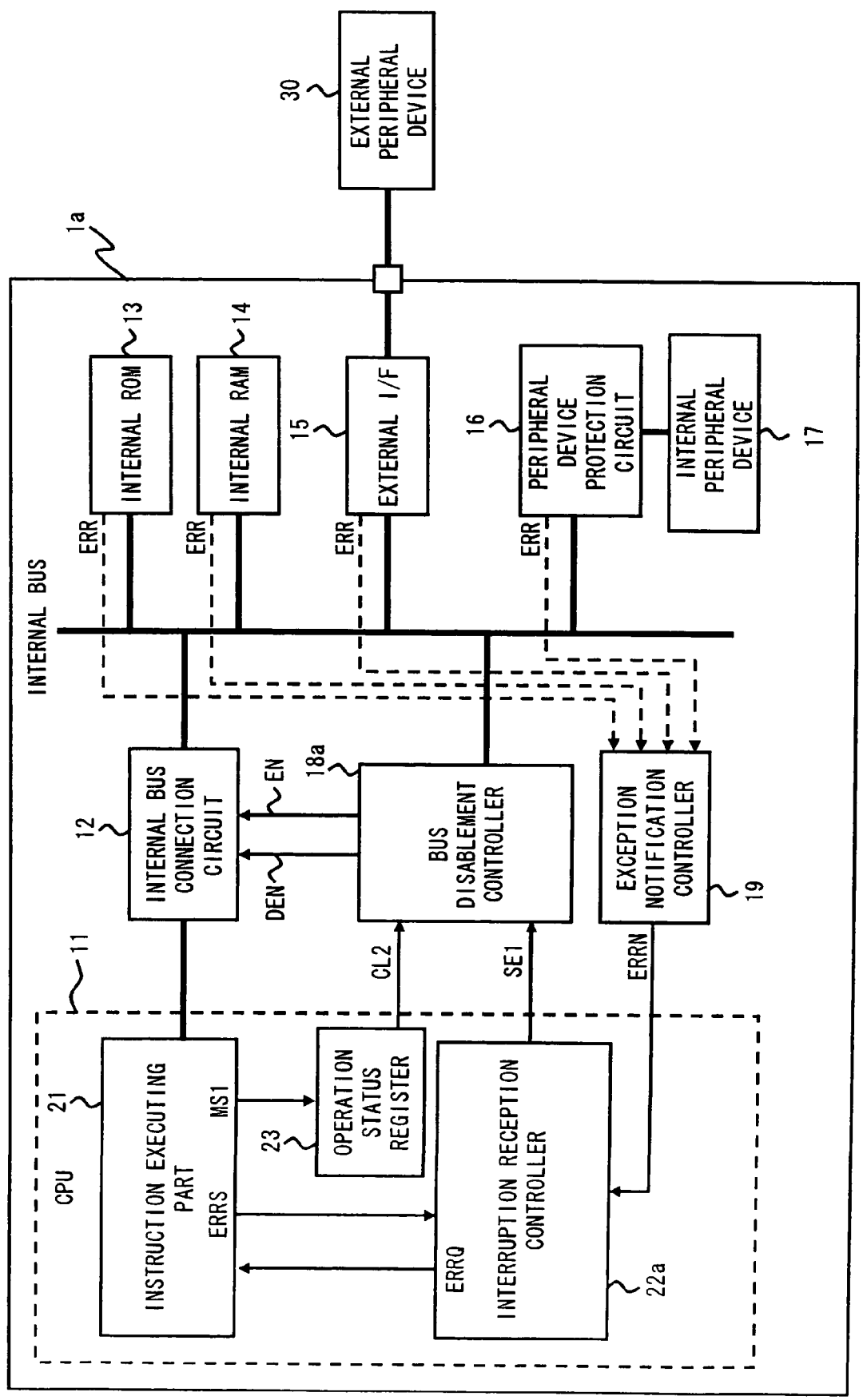
FIG. 4 is a block diagram showing another example of the data processing device according to the first exemplary embodiment.

Note that the data processing device 1 can be changed in various ways. One variant example is shown in FIG. 4, which shows a block diagram of a data processing device 1a which is the variant example of the data processing device 1. As shown in FIG. 4, the data processing device 1a includes an operation status register (authority status register) 23 in the CPU 11. The operation status register 23 stores the value (authority status) indicating the type of the operation authority of the task which is being executed by the instruction executing part 21. Therefore, the instruction executing part 21 outputs an operation mode setting signal MS1 and writes in the operation status register 23 the value indicating the type of the task which is being executed. The data processing device 1a uses the value stored in the operation status register 23 as a clear signal CL2. The data processing device 1a includes an interruption reception controller 22a only outputting the set signal SE1 instead of the interruption reception controller 22.

A bus disablement controller 18a used in the data processing device 1a stops the output of the disable signal DEN and outputs the enable signal EN when the clear signal CL2 indicates the privilege mode which is the operation authority of the task of the exception processing.

The data processing device 1a is the variant example of the method of outputting the clear signal. Accordingly, the clear signal output to the bus disablement controller can be any signal as long as the signal is output in synchronization with the start of the exception processing.

Second Exemplary Embodiment

Figure 5:
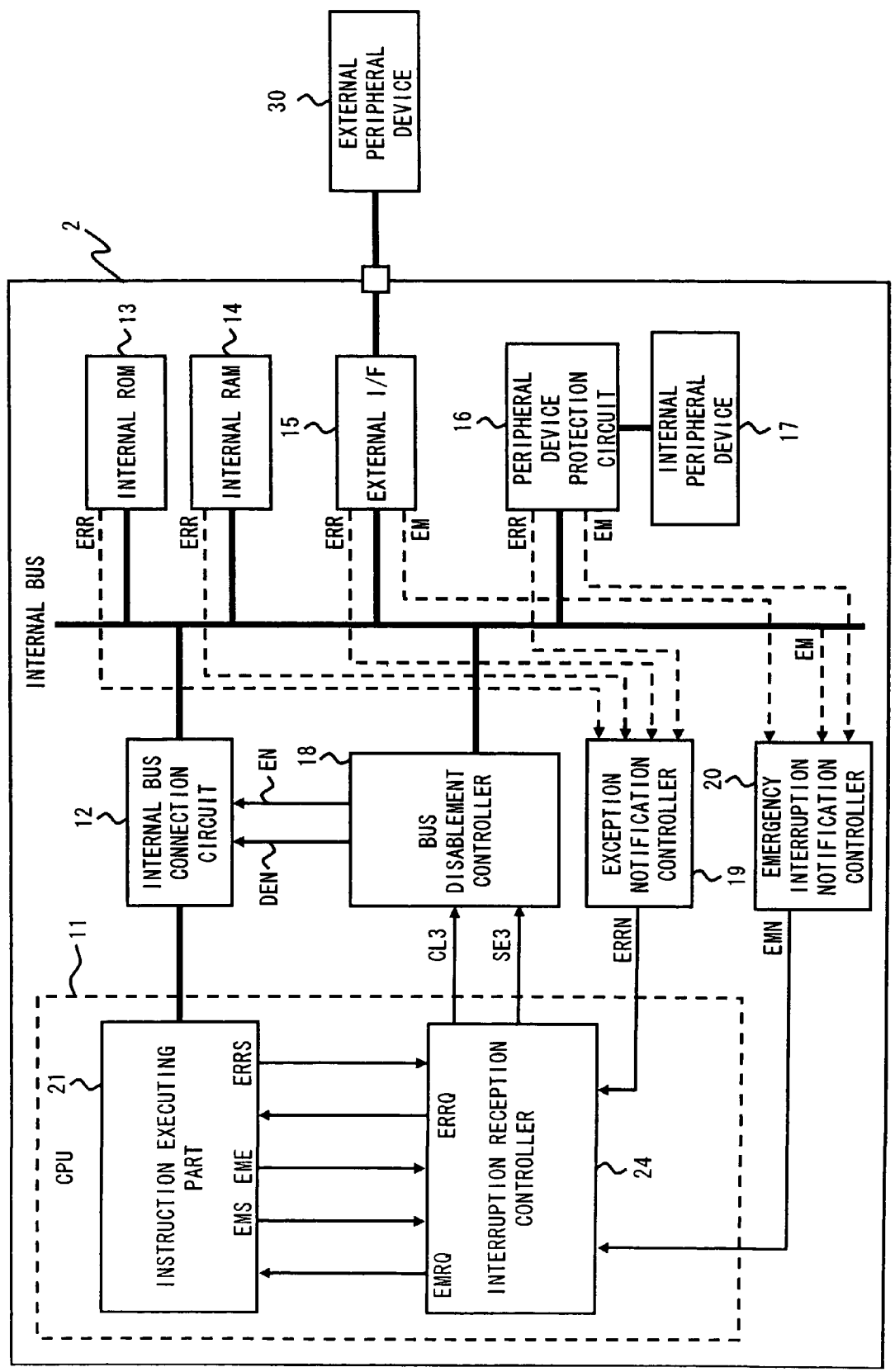
FIG. 5 is a block diagram showing a data processing device according to a second exemplary embodiment.

FIG. 5 shows a block diagram of a data processing device 2 according to the second exemplary embodiment. The data processing device 2 is employed when an emergency interruption processing having the highest priority in processing is occurred. The data processing device 2 includes an emergency interruption notification controller 20 in addition to the elements of the data processing device 1. Further, the data processing device 2 includes an interruption reception controller 24 in place of the interruption reception controller 22.

One example of the emergency interruption processing is an air bag control, and the emergency interruption processing is the processing which occurs irregularly and should be performed with highest priority. In the example shown in the second exemplary embodiment, the emergency interruption processing is performed based on an emergency interruption occurrence signal EM output from the peripheral device connected to the peripheral device protection circuit 16 or the external interface circuit 15, for example. Note that the emergency interruption occurrence signal EM may also be generated based on the instruction executed in the instruction executing part 21.

The emergency interruption notification controller 20 receives the emergency interruption occurrence signal EM output from the external interface circuit 15, the peripheral device protection circuit 16, or the instruction executing part 21. Then, the emergency interruption notification controller 20 outputs an emergency interruption notification signal EMN with an emergency interruption code indicating the type of the emergency interruption processing based on the emergency interruption occurrence signal EM.

The interruption reception controller 24 outputs an emergency interruption request signal EMRQ based on the emergency interruption notification signal EMN. Further, a set signal SE3 is output based on the exception occurrence notification signal ERRN, the emergency interruption processing completion signal EME, and the notification signal EMN, and a clear signal CL3 is output based on the exception processing start signal ERRS and the emergency interruption processing start signal EMS. Note that the set signal SE3 and the clear signal CL3 correspond to the set signal SE1 and the clear signal CL1 in the first exemplary embodiment.

The operation of the interruption reception controller 24 will be described further in detail. The interruption reception controller 24 keeps the state of the set signal SE3 and the clear signal CL3 when the emergency interruption processing start signal EMS is input in a period where the clear signal CL3 is output (a period where the internal bus connection circuit 12 enables the access from the CPU 11 to the internal bus). The interruption reception controller 24 also keeps the state of the set signal SE3 and the clear signal CL3 when the interruption processing completion signal EME is input in this period. On the other hand, the interruption reception controller 24 stops the output of the set signal SE3 and outputs the clear signal CL3 when the emergency interruption processing start signal EMS is input in a period where the set signal SE3 is output (a period where the internal bus connection circuit 12 disables the access from the CPU 11 to the internal bus). Further, the interruption reception controller 24 stops the clear signal CL3 and outputs the set signal SE3 when the interruption processing completion signal EME is input in this period.

Figure 6:
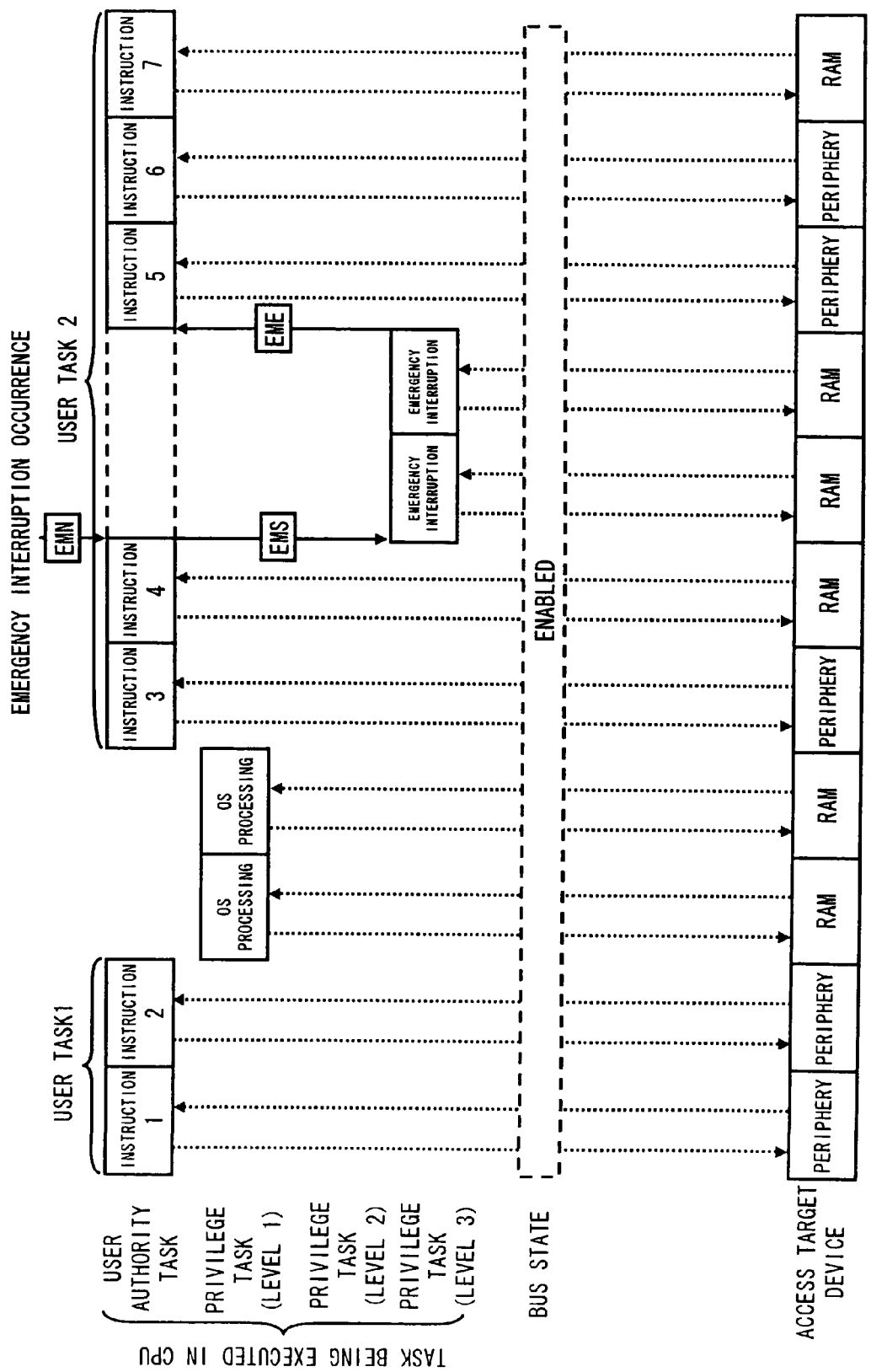
FIG. 6 is a timing chart showing an operation of the data processing device according to the second exemplary embodiment.

FIG. 6 shows a timing chart showing an example of the operation of the data processing device 2. In the example shown in FIG. 6, the emergency interruption processing is occurred without occurring the exception. Note that, in the following description, the emergency interruption processing is executed in the privilege level of the level 3 whose authority level is higher than the OS processing and the exception processing.

In the example shown in FIG. 6, instructions 1 and 2 are first executed as the user task 1, and the task is completed without exception. Then, the instruction executing part 21 moves the processing to the OS to execute the following user task 2. When instructions 3 and 4 of the user task 2 are executed, the emergency interruption is occurred. The interruption notification controller 20 outputs the emergency interruption notification signal EMN based on the occurrence of the emergency interruption, and the interruption reception controller 24 outputs the emergency interruption request signal EMRQ based on the emergency interruption notification signal EMN. Then, the instruction executing part 21 starts the emergency interruption processing based on the emergency interruption request signal EMRQ. Further, the instruction executing part 21 outputs the emergency interruption processing start signal EMS in accordance with the start of the emergency interruption processing. At this time, the clear signal CL3 is output from the interruption reception controller 24, and the internal bus connection circuit 12 enables the access from the CPU 11 to the internal bus. As such, the interruption reception controller 24 keeps the state of the set signal SE3 and the clear signal CL3 even when the emergency interruption processing start signal EMS is input. Then, upon completion of the emergency interruption processing in the instruction executing part 21, the instruction executing part 21 outputs the emergency interruption processing completion signal EME. Further, the instruction executing part 21 changes the task to be executed from the emergency interruption processing to the instruction 5 of the user task 2.

Figure 7:
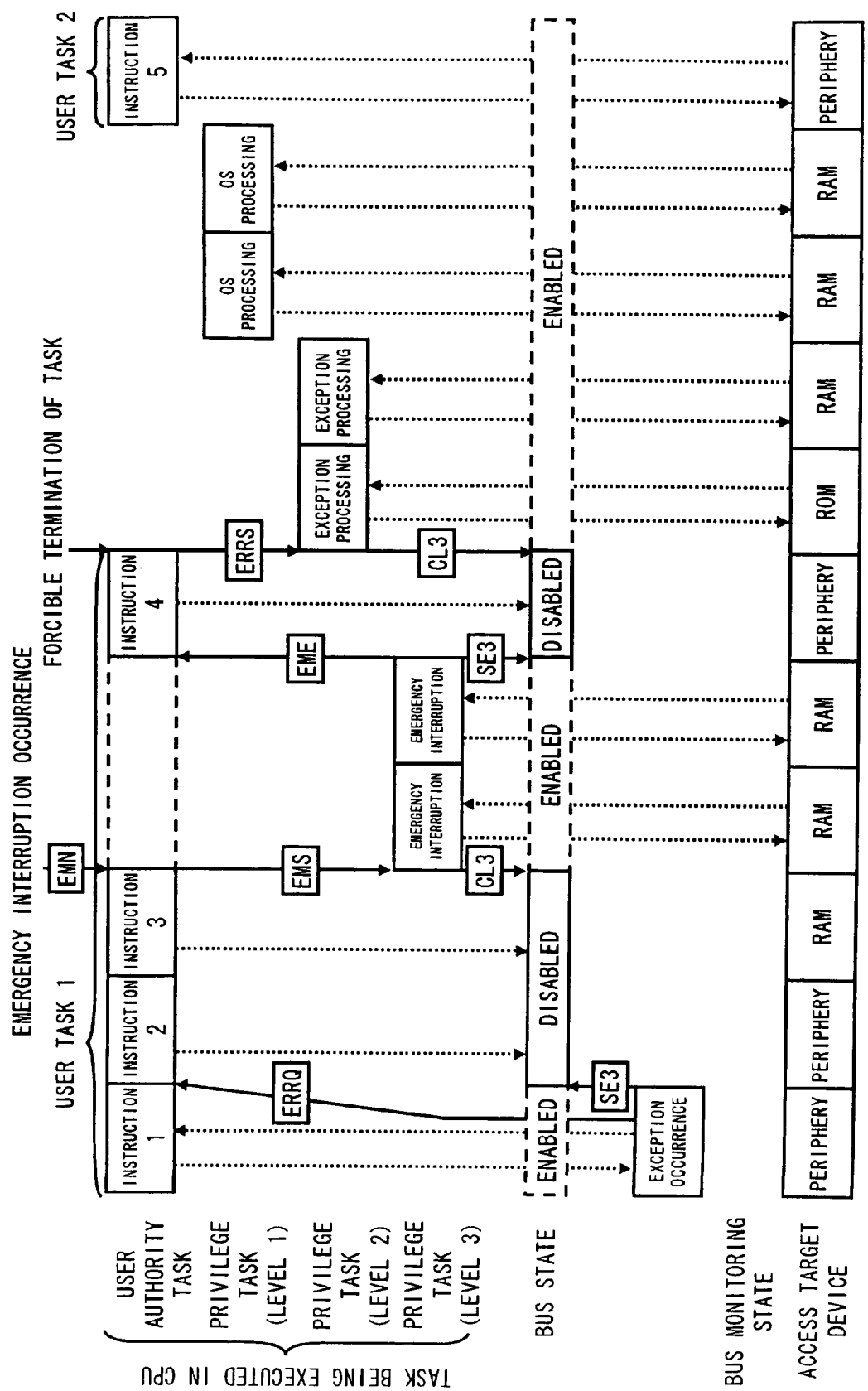
FIG. 7 is a timing chart showing the operation of the data processing device according to the second exemplary embodiment.

FIG. 7 shows a timing chart showing another example of the operation of the data processing device 2. In the example shown in FIG. 7, the emergency interruption processing is occurred in a state where the internal bus is disabled due to the occurrence of the exception.

In the example shown in FIG. 7, the exception is first occurred in the instruction 1 executed as the user task 1. The instruction 1 accesses the internal peripheral device 17. However, this access is regarded as unauthorized, and the exception occurrence signal ERR is output by the peripheral device protection circuit 16. The exception notification controller 19 receiving the exception occurrence signal ERR outputs the exception occurrence notification signal ERRN. Then, the interruption reception controller 24 receiving the exception occurrence notification signal ERRN outputs the interruption request signal ERRQ to the instruction executing part 21. Further, the interruption reception controller 24 outputs the set signal SE3 to the bus disablement controller 18 based on the exception occurrence notification signal ERRN. Then, the bus disablement controller 18 receiving the set signal SE3 outputs the disable signal DEN to the internal bus connection circuit 12, and the internal bus connection circuit 12 disables the access from the CPU 11 to the internal bus.

The instruction executing part 21 receives the interruption request signal ERRQ at the same time as the completion of the instruction 1. At this time, since the instructions 2 to 4 have already been executed speculatively, the exception processing based on the interruption request signal ERRQ is suspended until when the instruction 4 is completed. In the example shown in FIG. 7, the emergency interruption is occurred after the execution of the instruction 3. The interruption notification controller 20 outputs the emergency interruption notification signal EMN based on the occurrence of the emergency interruption, and the interruption reception controller 24 outputs the emergency interruption request signal EMRQ based on the emergency interruption notification signal EMN. Then the instruction executing part 21 starts the emergency interruption processing based on the emergency interruption request signal EMRQ. Further, the instruction executing part 21 outputs the emergency interruption processing start signal EMS according to the start of the emergency interruption processing. At this time, the interruption reception controller 24 outputs the set signal SE3, and the internal bus connection circuit 12 disables the access from the CPU 11 to the internal bus. Therefore, the interruption reception controller 24 stops the set signal SE3 and outputs the clear signal CL3 in accordance with the input of the emergency interruption processing start signal EMS. Accordingly, the bus disablement controller 18 outputs the enable signal EN, and the internal bus connection circuit 12 cancels the disablement of the access from the CPU 11 to the internal bus.

Since the disablement of the internal bus is canceled in accordance with the start of the emergency interruption processing, the instruction executing part 21 executes the emergency interruption processing while accessing the internal bus without limitation. Then, upon completion of the emergency interruption processing in the instruction executing part 21, the instruction executing part 21 outputs the emergency interruption processing completion signal EME. Then the interruption reception controller 24 outputs the set signal SE3 based on the emergency interruption processing completion signal EME. Accordingly, the bus disablement controller 18 outputs the disable signal DEN, and the internal bus connection circuit 12 disables the access from the CPU 11 to the internal bus. After that, the instruction executing part 21 returns the task to be executed from the emergency interruption processing to the instruction 4 of the user task 1.

Next, the instruction 4 is executed in the instruction executing part 21. At this time, the access from the CPU 11 to the internal bus is disabled; therefore, this access is interrupted by the internal bus connection circuit 12 without being output to the internal bus. Upon completion of the processing of the instruction 4, the instruction executing part 21 starts the exception processing. The operation after the exception processing is substantially the same as the operation shown in FIG. 3; therefore, the description will be omitted here.

From the above description, in the data processing device 2, the disablement of the internal bus is canceled only in a period where the emergency interruption processing is being performed when the emergency interruption processing is occurred in a state where the internal bus is disabled. When there is no means of canceling the disablement of the internal bus executed in the data processing device 2, it is impossible to employ the internal bus in the emergency interruption processing, and it may not be possible to accurately carry out the emergency interruption processing. However, in the data processing device 2 according to the second exemplary embodiment, it is possible for the instruction executing part 21 to perform the emergency interruption processing while accessing the internal bus without limitation. Further, by implementing the means of canceling the disablement of the internal bus by the hardware as above, the state of the internal bus needs not be considered in creating a program of the emergency interruption processing. As such, the data processing device 2 of the second exemplary embodiment makes it possible to easily create the program of the emergency interruption processing.

Figure 8:
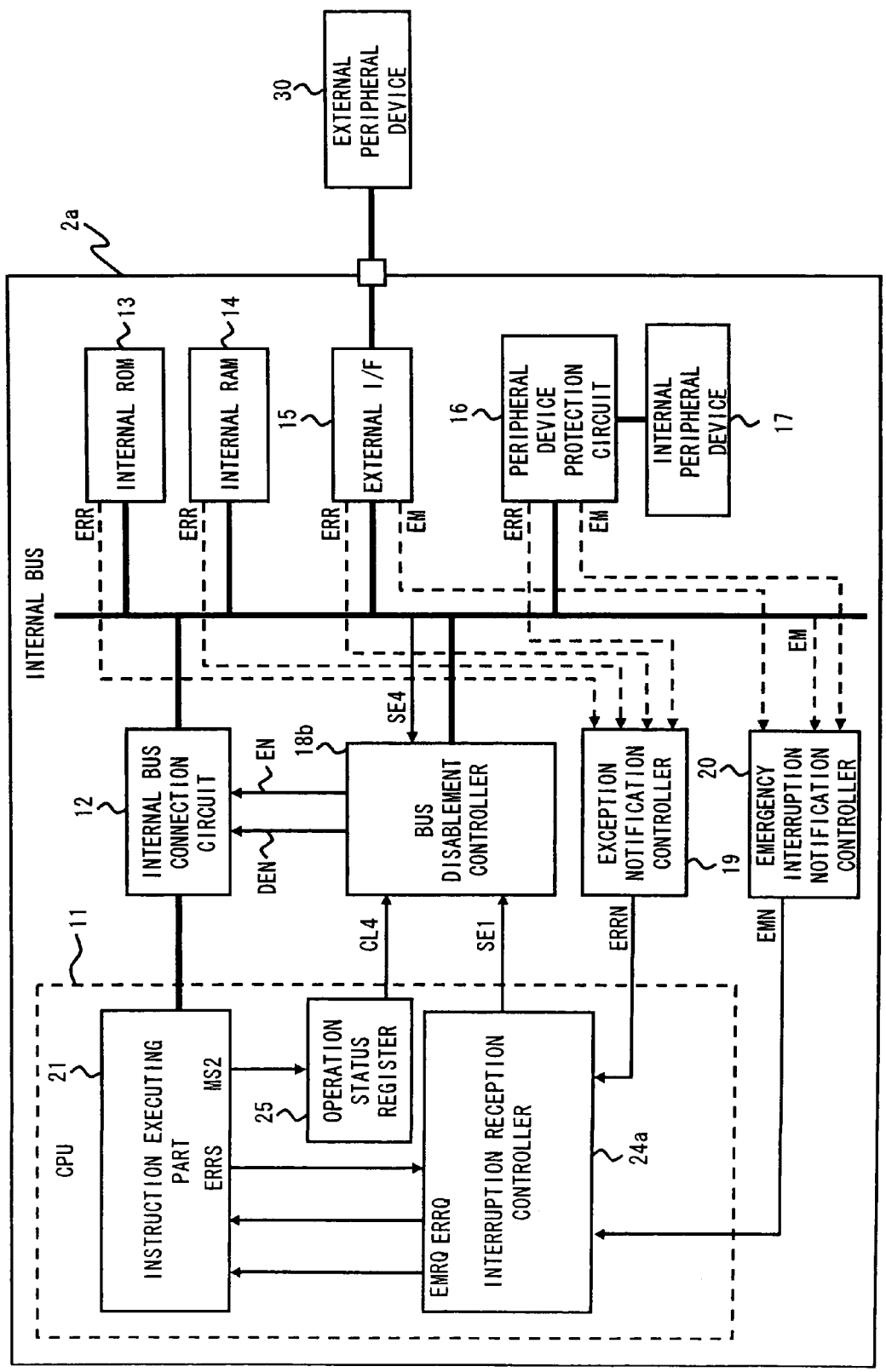
FIG. 8 is a block diagram showing another example of the data processing device according to the second exemplary embodiment.

Further, it is possible to consider a variant example using the operation status register in the second exemplary embodiment as well as in the first exemplary embodiment. FIG. 8 shows a block diagram of a data processing device 2a showing the variant example of the data processing device 2 according to the second exemplary embodiment. As shown in FIG. 8, the data processing device 2a includes an operation status register 25 in the CPU 11. The operation status register 25 stores the value indicating the type of the operation authority of the task which is being executed by the instruction executing part 21. Accordingly, the instruction executing part 21 outputs an operation mode setting signal MS2 and writes in the operation status register 25 the value indicating the type of the task which is being executed. The data processing device 2a employs the value stored in the operation status register 25 as a clear signal CL4. Note that the data processing device 2a includes an interruption reception controller 24a which only outputs the set signal SE1 instead of the interruption reception controller 24.

When the clear signal CL4 indicates the privilege mode of the operation authority of the emergency interruption processing and the task of the exception processing, the bus disablement controller 18b used in the data processing device 2a stops the output of the disable signal DEN and outputs the enable signal EN. Further, upon completion of the emergency interruption processing in the instruction executing part 21, the instruction executing part 21 in the data processing device 2a notifies the bus disablement controller 18b of the set signal SE4 through the internal bus. When the set signal SE4 is input after the disablement of the internal bus is canceled by the clear signal CL4, the bus disablement controller 18b outputs the disable signal DEN.

The data processing device 2a is the variant example of the method of outputting the set signal and the clear signal. The set signal and the clear signal output to the bus disablement controller can be any signals as long as the signals are output in synchronization with the start of the exception processing and the signals can cancel the disablement only when the emergency interruption processing is being executed.

Third Exemplary Embodiment

Figure 9:
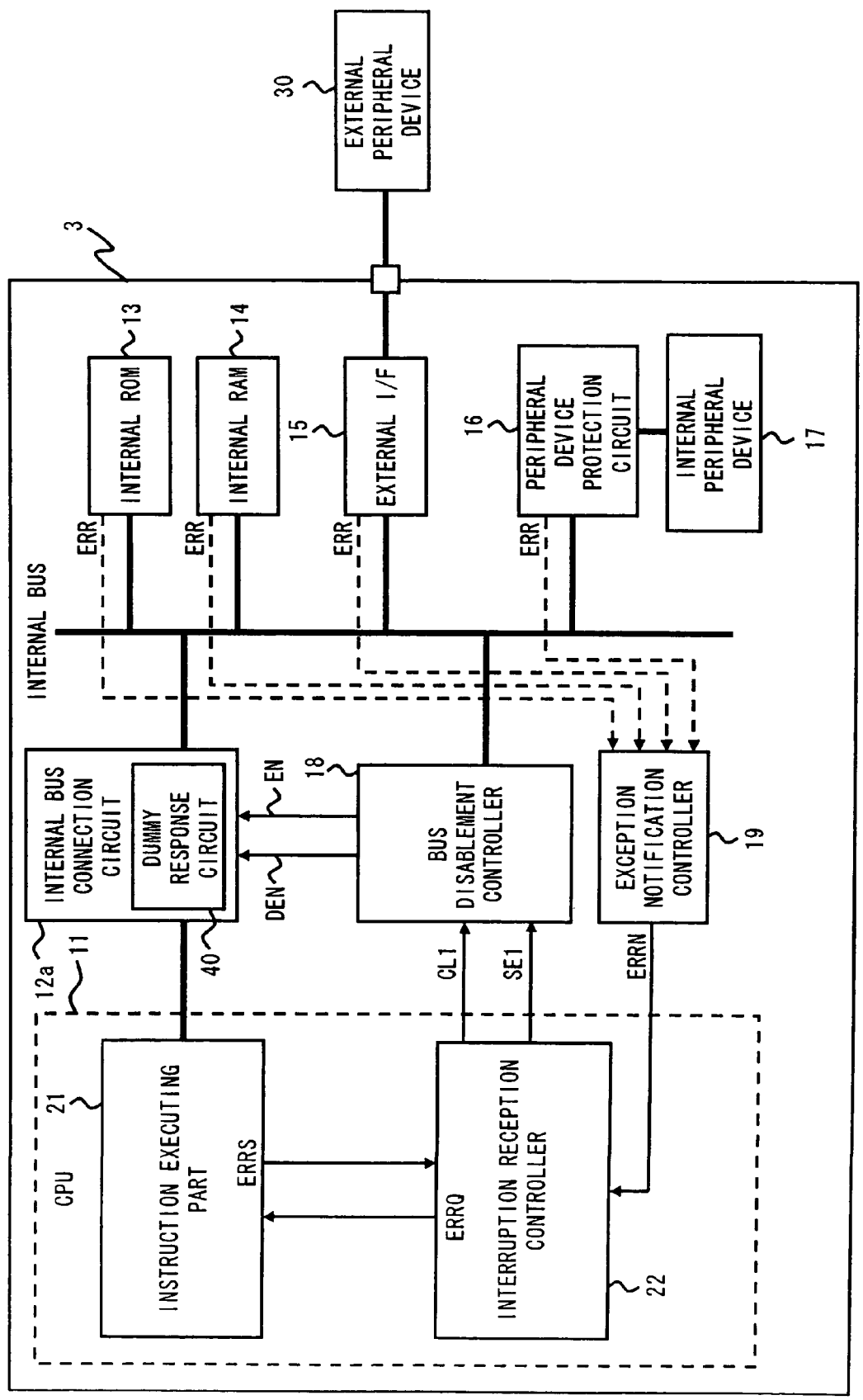
FIG. 9 is a block diagram showing a data processing device according to a third exemplary embodiment.

FIG. 9 shows a block diagram of a data processing device 3 according to the third exemplary embodiment. The data processing device 3 shows a variant example of the data processing device 1 according to the first exemplary embodiment. The data processing device 3 includes an internal bus connection circuit 12a in place of the internal bus connection circuit 12. The internal bus connection circuit 12a includes a dummy response circuit 40 in addition to the function of the internal bus connection circuit 12.

The dummy response circuit 40 sends a bus access completion signal (hereinafter referred to as dummy response) back to the CPU 11 temporarily when the CPU 11 accesses the internal bus in a period where the internal bus connection circuit 12a disables the access from the CPU 11 to the internal bus. Now, the operation of the dummy response circuit 40 will be described with reference to FIG. 10, which shows a timing chart showing the operation of the data processing device 3. The example shown in FIG. 10 is the one in which the operation of the dummy response circuit 40 is added to the timing chart of the data processing device 1 shown in FIG. 3.

Figure 10:
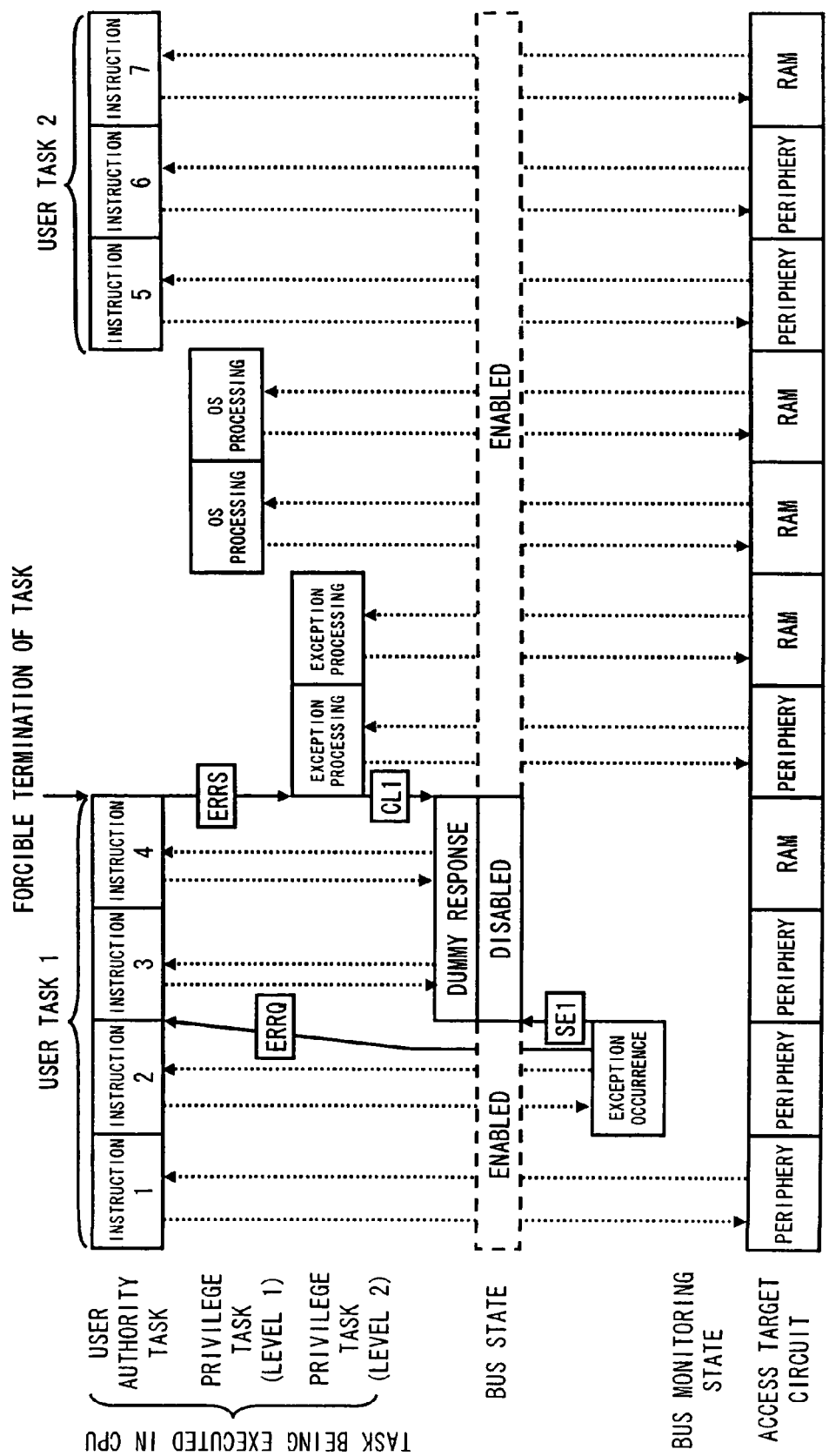
FIG. 10 is a timing chart showing an operation of the data processing device according to the third exemplary embodiment.

As shown in FIG. 10, the dummy response is generated when the CPU 11 accesses the internal bus in a period where the internal bus is disabled. In the example shown in FIG. 10, the instructions 3 and 4 access the internal bus in a period where the internal bus is disabled. Then, the dummy response is sent back so as to respond to the access of the instructions 3 and 4.

The tasks executed in the CPU 11 include a task which terminates only after the completion of the bus access is confirmed. When there is included such a task, the bus access is not completed when the internal bus is simply disabled. In such a case, the task does not terminate indefinitely. In this case, the exception processing which has been suspended may not be executed indefinitely. However, by executing the dummy response as in the data processing device 3, the task can be completed by sending back the dummy response after the disablement of the internal bus even when there is included a task which terminates only after the completion of the bus access is confirmed.

Fourth Exemplary Embodiment

Figure 11:
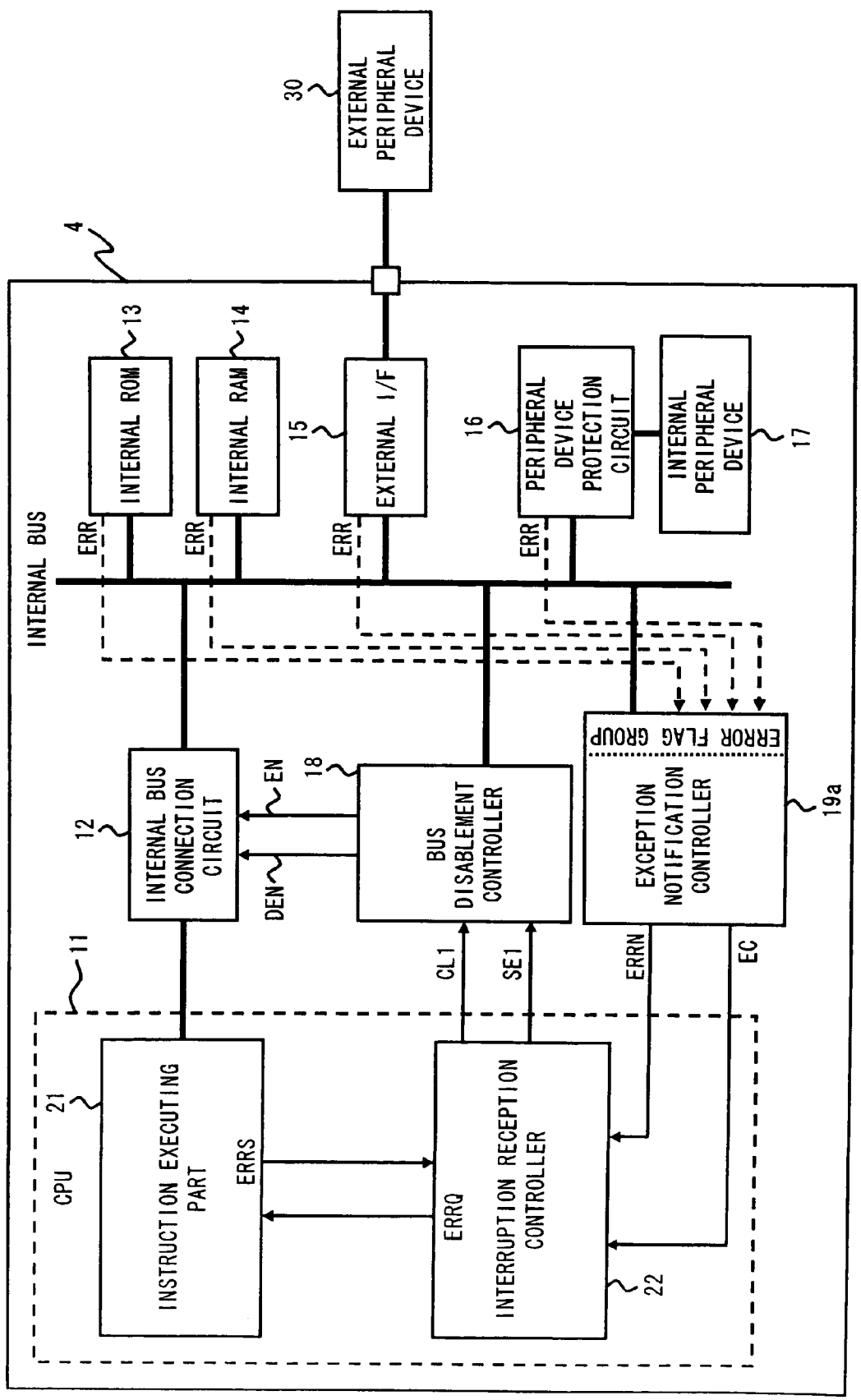
FIG. 11 is a block diagram of a data processing device according to a fourth exemplary embodiment.

FIG. 11 is a block diagram of a data processing device 4 according to the fourth exemplary embodiment. The data processing device 4 shows a variant example of the data processing device 1 according to the first exemplary embodiment. The data processing device 4 includes an exception notification controller 19a in place of the exception notification controller 19. The exception notification controller 19a includes an error flag group storage, where the type of the exception occurred in the peripheral device is stored. Further, the exception notification controller 19a controls whether the exception occurrence notification signal ERRN and the exception code signal EC are output depending on the type of the exception stored in the error flag group storage.

Figure 12:
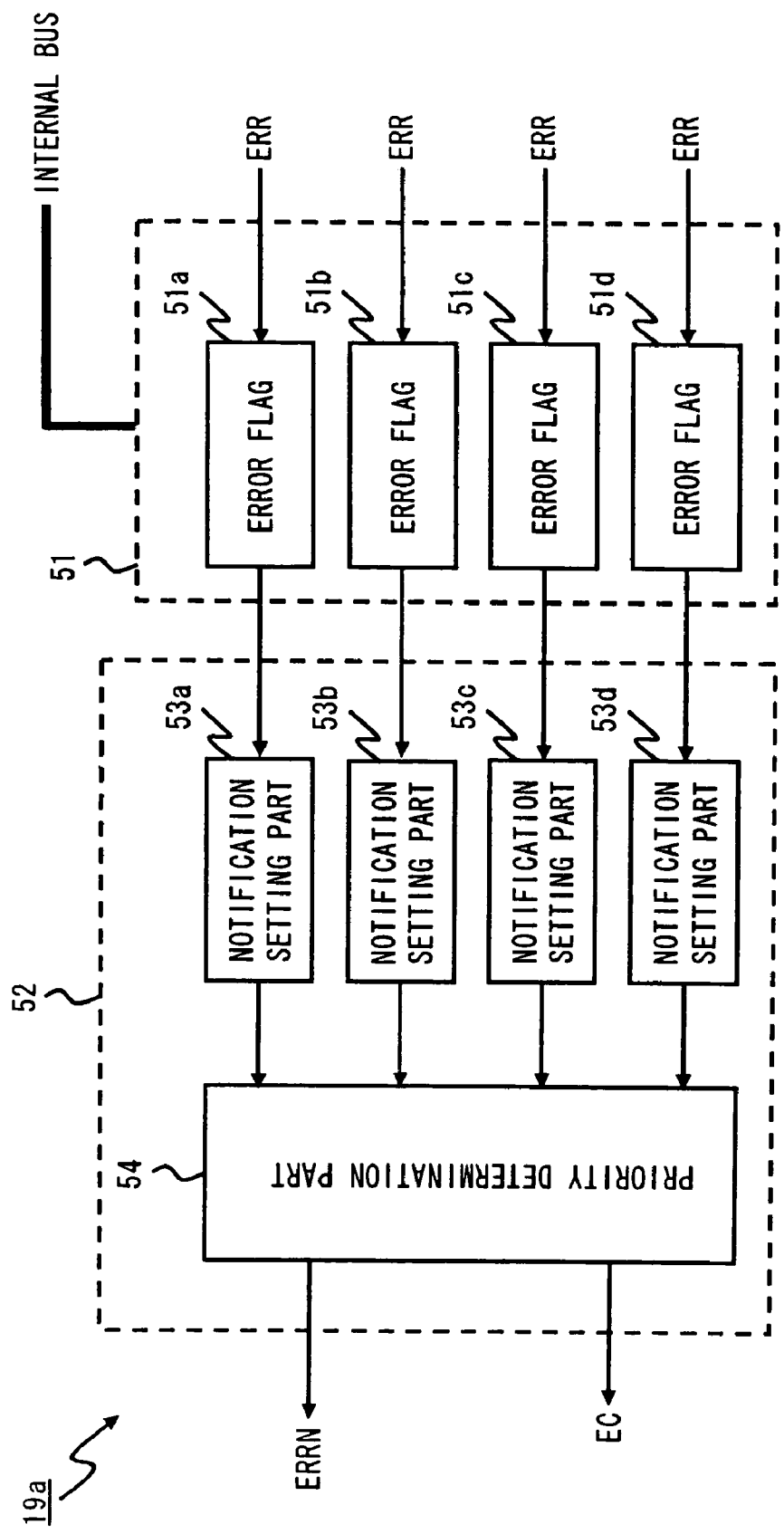
FIG. 12 is a block diagram showing an exception notification controller according to the fourth exemplary embodiment.

FIG. 12 shows a block diagram of the exception notification controller 19a. As shown in FIG. 12, the exception notification controller 19a includes an error flag group storage 51 and an exception determination part 52. The error flag group storage 51 includes a plurality of error flags (error flags 51a to 51d in the example of FIG. 12). The error flags 51a to 51d are provided in accordance with each of the peripheral devices outputting the exception occurrence signal ERR. Further, the error flags 51a to 51d include a plurality of registers individually storing the type of the exception. priority determination part The exception determination part 52 includes notification setting parts 53a to 53d and a priority determination part 54. The notification setting parts 53a to 53d are provided in accordance with the error flags 51a to 51d. The notification setting parts 53a to 53d set the type of the exception of which is notified as the exception out of the type of the exceptions stored in the error flags. Based on this setting, the notification setting parts 53a to 53d output only the exception of which is set to be notified out of the occurred exceptions to the priority determination part 54 in the later step. The priority determination part 54 outputs the exception occurrence notification signal ERRN regarding the exception of higher priority out of the notified exceptions and further outputs the exception code signal EC related to the exception to be notified of in accordance with the notification of the exception occurrence notification signal ERRN.

Figure 13:
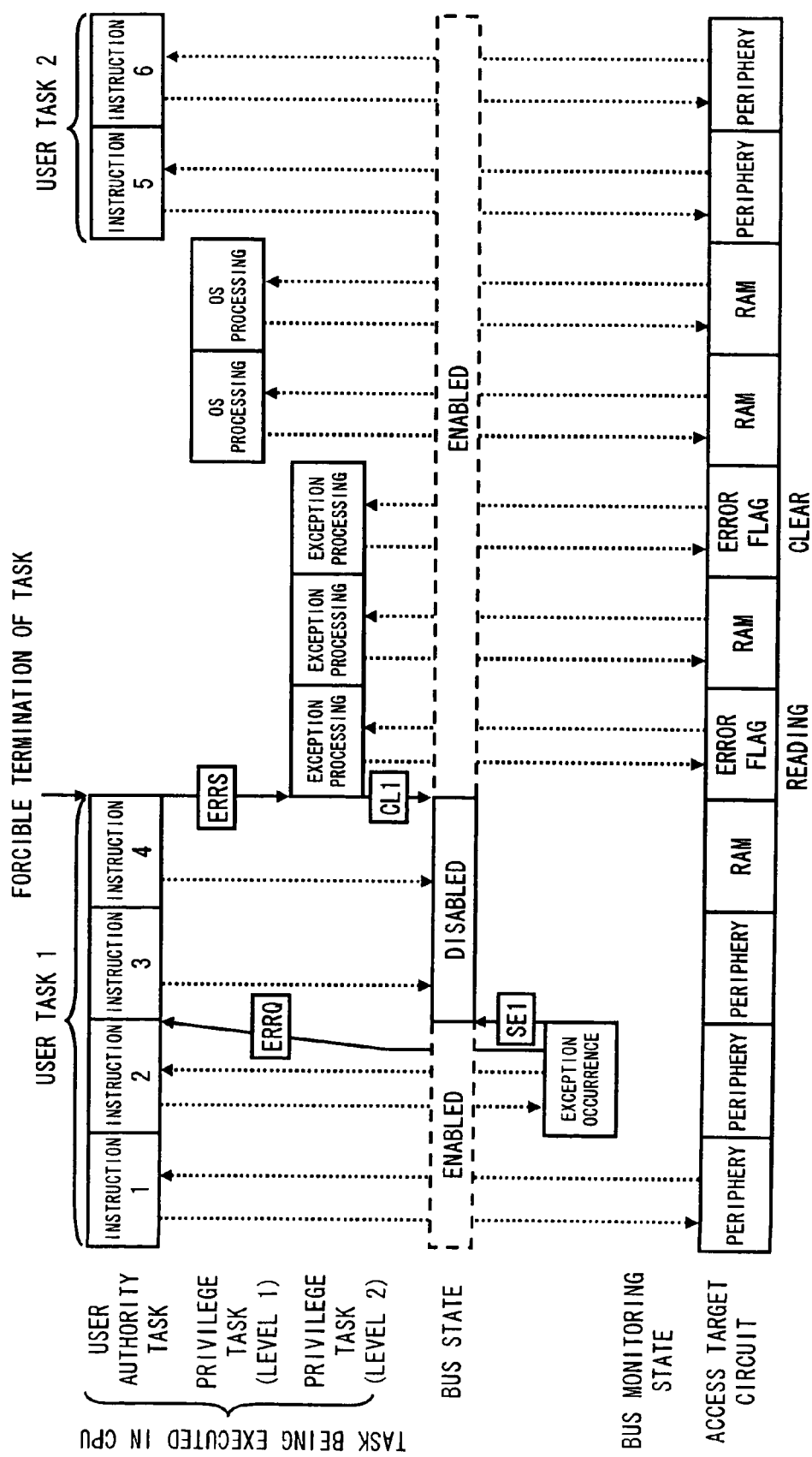
FIG. 13 is a timing chart showing the operation of the data processing device according to the fourth exemplary embodiment.

Now, the operation of the data processing device 4 in a case where the exception notification controller 19a is used will be described. FIG. 13 shows a timing chart showing the operation of the data processing device 4. The example shown in FIG. 13 is the one in which the operation regarding the exception processing notification controller 19a is applied to the operation of the data processing device 1 shown in FIG. 3. As shown in FIG. 13, the instruction executing part 21 executes the exception processing referring to the error flags in the exception processing by employing the exception processing notification controller 19a. Further, the information of the error flags which are referred at a time where the exception processing is completed is cleared.

Figure 14:
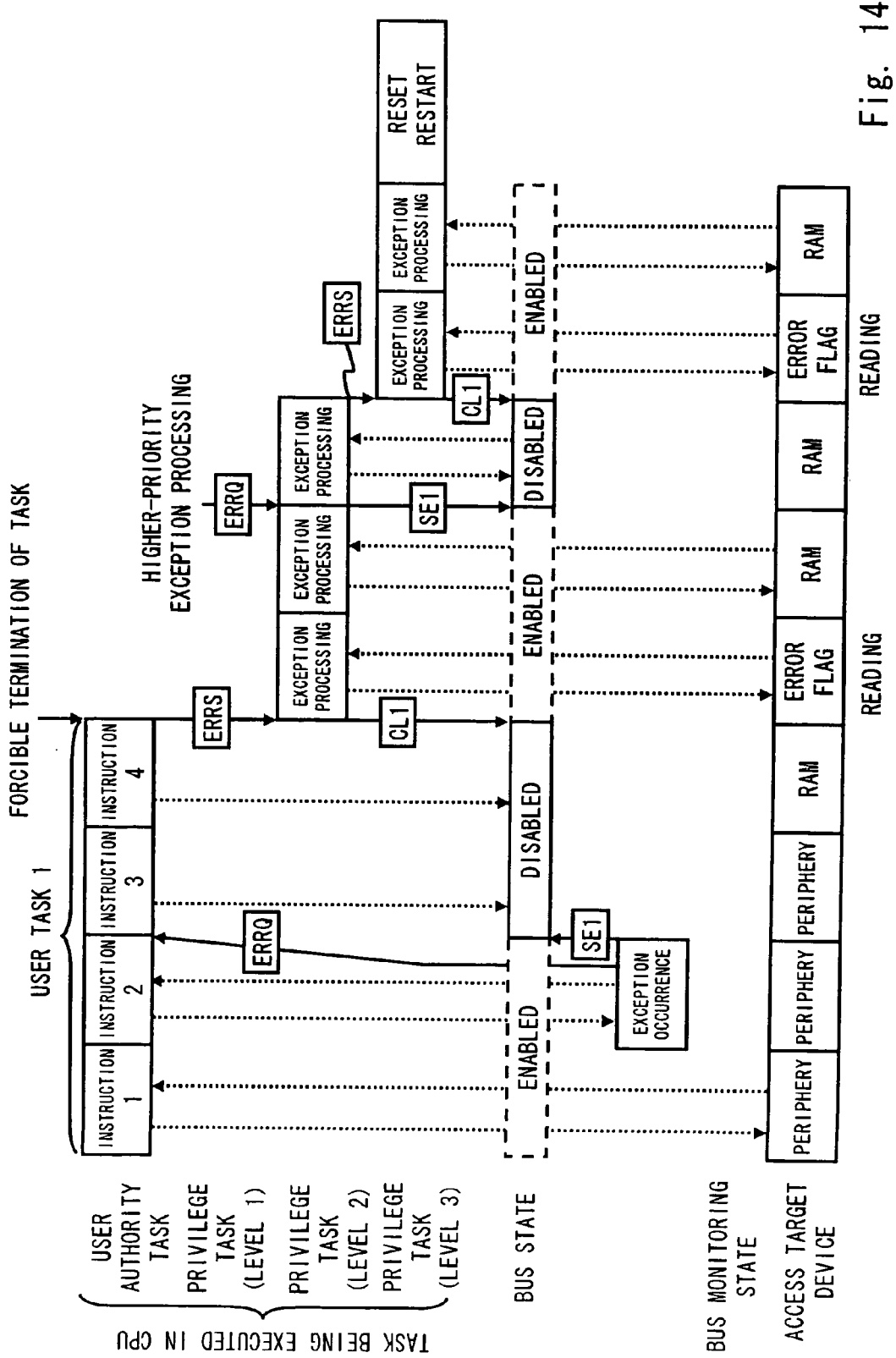
FIG. 14 is a timing chart showing the operation of the data processing device according to the fourth exemplary embodiment.

Further, another example of the operation of the data processing device 4 when the exception notification controller 19a is employed will be described. FIG. 14 shows a timing chart showing another example of the operation of the data processing device 4. In the example shown in FIG. 14, the higher-priority exception processing is further occurred in the exception processing of the data processing device 4 shown in FIG. 13. As shown in FIG. 14, when the higher-priority exception processing is occurred, the data processing device disables the internal bus by the set signal SE1, and prevents the access to the internal bus in the lower-priority exception processing. Then, the disablement of the internal bus is canceled by the clear signal CL1 in accordance with the start of the higher-priority exception processing. Accordingly, the higher-priority exception processing can be executed without being subjected to the access restriction to the internal bus. Further, it is possible to refer to the error flags even in the higher-priority exception processing. In the higher-priority exception processing, the recovery of the data processing device 4 is performed by the reset operation.

As such, by executing the exception processing by referring to the information of the error flags, it is possible to execute the exception processing with higher accuracy in accordance with the type of the exception that is occurred. Further, when it is set by the notification setting parts 53a to 53d that the exception occurrence notification signal ERRN is not output in case of the minor exception, the information regarding the minor exception can be referred to in the exception processing for the major exception. Further, it is possible to decrease the frequency of the exception processing and to improve the process performance of the data processing device 4 by determining that the notification is not performed in case of the minor exception.

Fifth Exemplary Embodiment

Figure 15:
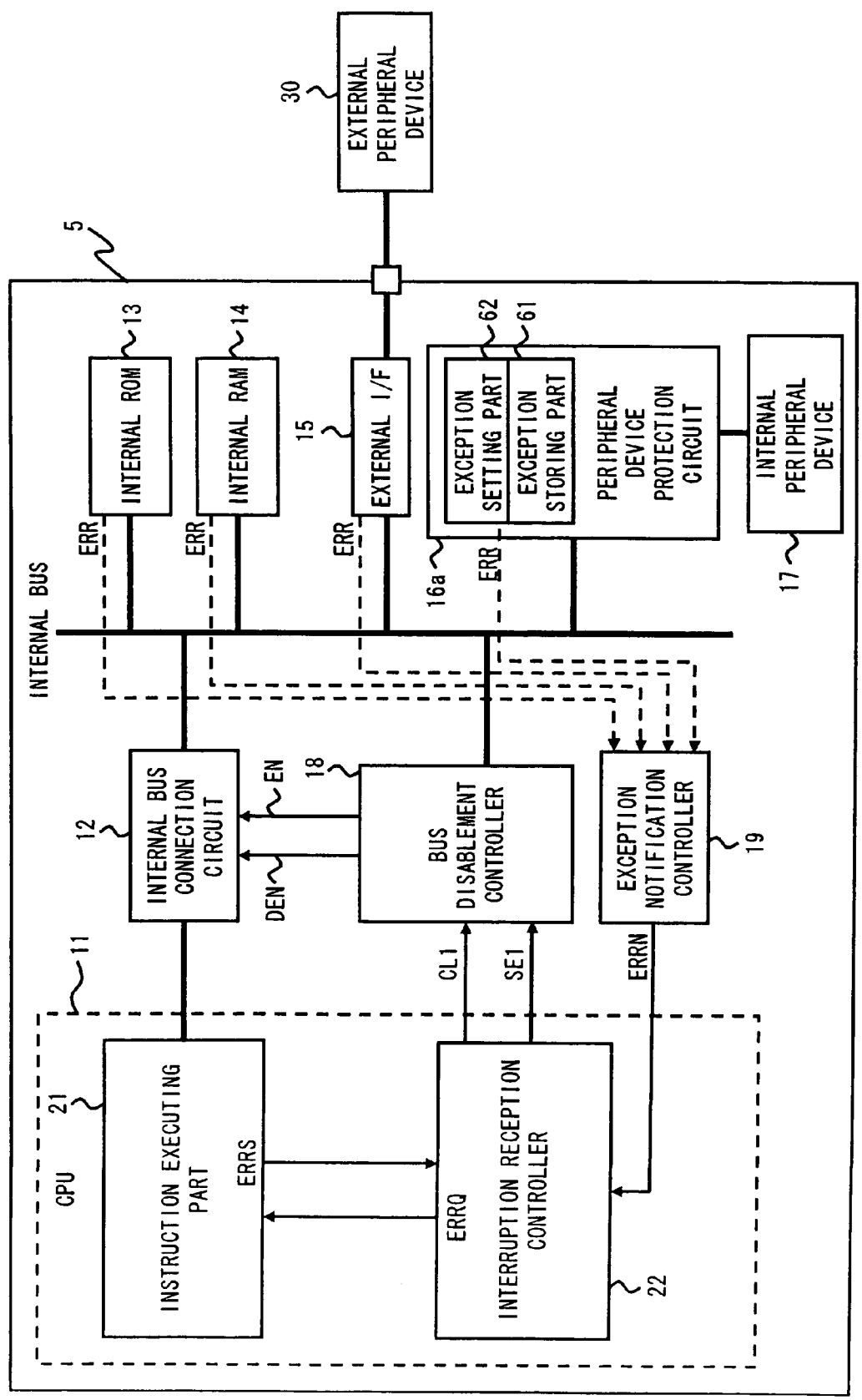
FIG. 15 is a block diagram of a data processing device according to a fifth exemplary embodiment.
Figure 16:
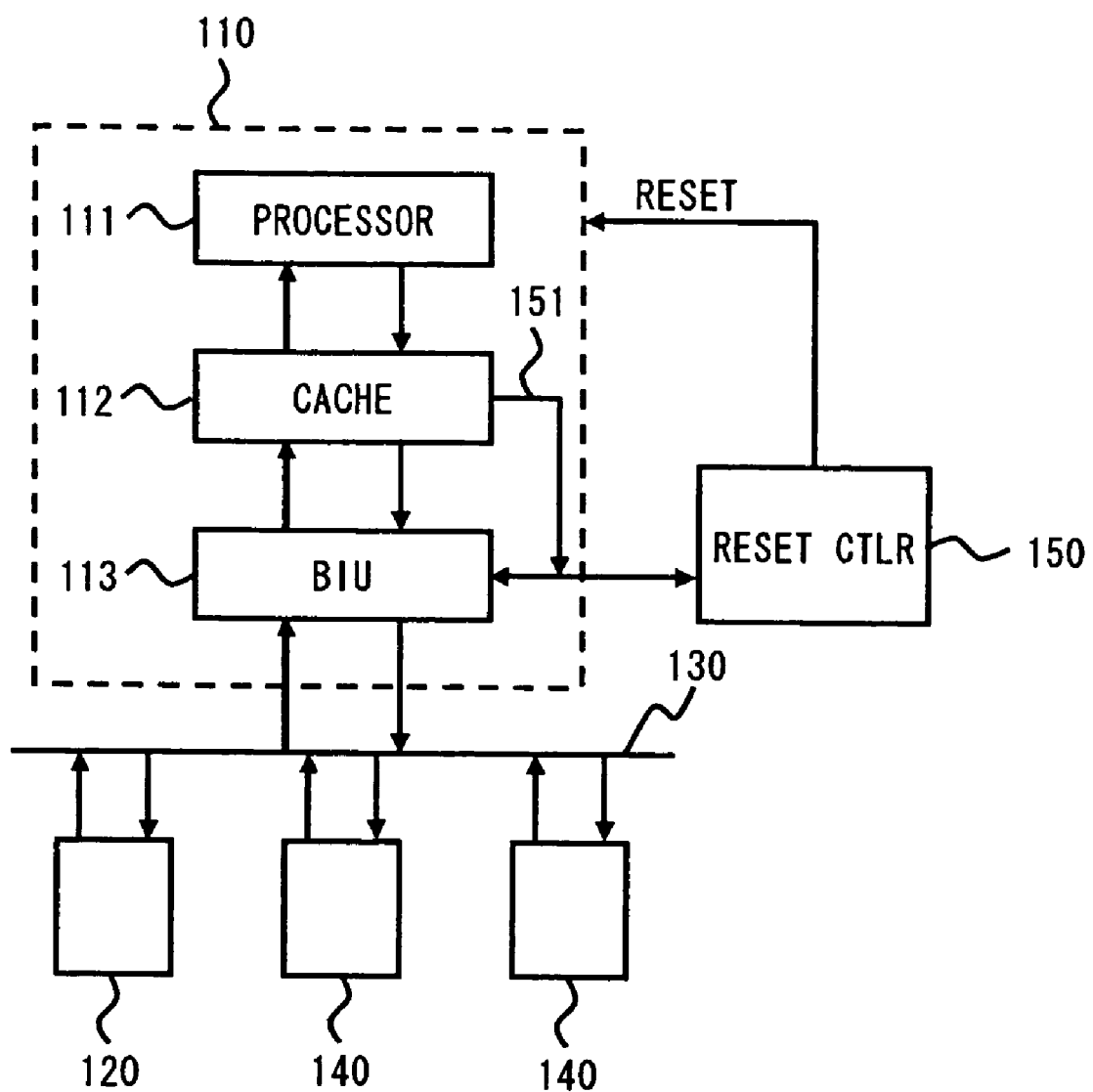
FIG. 16 is a block diagram of a data processing device according to a related art.

FIG. 15 shows a block diagram of a data processing device 5 according to the fifth exemplary embodiment. The data processing device 5 is a variant example of the data processing device 1 according to the first exemplary embodiment. The data processing device 5 includes a peripheral device protection circuit 16a in place of the peripheral device protection circuit 16. The peripheral device protection circuit 16a includes an exception storing part 61 and an exception setting part 62 in addition to the elements of the peripheral device protection circuit 16. The exception storing part 61 stores the exception occurred in the peripheral device protection circuit 16a. The exception setting part 62 outputs the exception occurrence signal ERR only when the exception which is equal to or more than the predetermined level is occurred in the exception storing part 61. For example, the exception occurrence signal ERR may not be output by the exception setting part 62 for the minor exception.

As such, the exception occurred in the peripheral device protection circuit 16a is stored to output only the exception which is equal to or more than the predetermined level, whereby it is possible to decrease the frequency of the exception processing occurred in the data processing device 1. Further, by storing the exception which is occurred, the detailed return processing referring to the exception stored in the processing after the exception processing and so on can be executed. Further, the debugging efficiency of the user task can be improved by storing the exception and referring to the exception later.

Note that the present invention is not limited to the above exemplary embodiments but can be changed as appropriate without departing from the scope of the present invention. For example, in the above description, the state in which the exception occurrence signal ERR or the emergency interruption occurrence signal EM is output is merely an example, and the state in which these signals are output can be changed as appropriate depending on the structure of the data processing device.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A data processing device comprising:
    a computing circuit that accesses a peripheral device connected thereto via an internal bus;
    an internal bus connection circuit, provided between the computing circuit and the internal bus, that selectively switches an enable state and a disable state of an access from the computing circuit to the internal bus;
    an exception notification controller that outputs an exception occurrence notification signal to the computing circuit based on an error having occurred in the peripheral device; and
    a bus disablement controller that instructs the internal bus connection circuit to disable an access from the computing circuit to the internal bus in accordance with the exception occurrence notification signal, and instructs the internal bus connection circuit to cancel a disablement of the access from the computing circuit to the internal bus in accordance with a start of an exception processing based on the exception occurrence notification signal,
    wherein the exception processing is performed by retrieving an exception processing program stored in the peripheral device through the internal bus for the computing circuit and executing the exception processing program.

2. The data processing device according to claim 1, wherein:
    the computing circuit comprises an interruption reception controller,
    the interruption reception controller outputs a set signal to the bus disablement controller based on the exception occurrence notification signal, and outputs a clear signal to the bus disablement controller in accordance with the start of the exception processing based on the exception occurrence notification signal,
    the set signal instructs the internal bus connection circuit to disable the access from the computing circuit to the internal bus, and
    the clear signal instructs the internal bus connection circuit to cancel the disablement of the access from the computing circuit to the internal bus.

3. The data processing device according to claim 2, wherein:
the interruption reception controller outputs an emergency interruption request signal to an instruction executing part included in the computing circuit in accordance with an emergency interruption notification signal,
when the bus disablement controller instructs the internal bus connection circuit to disable the access when the interruption reception controller is outputting an emergency interruption request signal, the interruption reception controller outputs the clear signal, and the interruption reception controller outputs the set signal in accordance with a completion of an emergency interruption processing in the instruction executing part, and the emergency interruption notification signal notifies an occurrence of an emergency interruption processing having a higher priority than the exception processing output from the peripheral circuit.

4. The data processing device according to claim 2, wherein the computing circuit comprises:
an interruption reception controller that outputs a set signal to the bus disablement controller based on the exception occurrence notification signal; and
an operation status register that stores an authority status of a task executing in the computing circuit, such that, when the internal bus connection circuit is instructed to disable the access from the computing circuit to the internal bus,
when the authority status shows higher priority than the exception processing, the bus disable controller instructs the internal bus connection circuit to cancel the disablement of the access from the computing circuit to the internal bus, and instructs the internal bus connection circuit to disable the access from the computing circuit to the internal bus, in accordance with a completion of an emergency interruption processing in an instruction executing part.

5. The data processing device according to claim 2, wherein the computing circuit comprises:
an interruption reception controller that outputs a set signal to the bus disablement controller based on the exception occurrence notification; and
an operation status register that stores an authority status of a task executing in the computing circuit,
wherein the bus disablement controller instructs the internal bus connection circuit to disable the access from the computing circuit to the internal bus based on the set signal, and, in a case where the authority status shows a task executing the exception processing, the bus disablement controller instructs the internal bus connection circuit to cancel the disablement of the access from the computing circuit to the internal bus.

6. The data processing device according to claim 1, wherein the internal bus connection circuit further comprises a dummy response circuit that sends a response back to the computing circuit temporarily in a period where the internal bus connection circuit disables the access from the computing circuit to the internal bus.

7. The data processing device according to claim 1, wherein the exception notification controller comprises:
an error flag group storage that stores types of errors occurred in the peripheral device as error flags; and
a priority determination part that determines whether the priority determination part outputs the exception occurrence notification signal to the computing circuit, based on priorities of the error flags stored in the error flag group storage.

8. The data processing device according to claim 1, wherein the peripheral device comprises:
an internal peripheral device including a predetermined function; and
a peripheral device protection circuit that protects the internal peripheral device by restricting the access to the internal peripheral device through the internal bus, and the peripheral device protection circuit comprises:
an exception storing part to store information of an error occurred in an access to the internal peripheral device; and
an exception setting part to control whether the exception setting part notifies an exception occurrence signal in accordance with a seriousness of the information of the error stored in the exception storing part, and an exception occurrence signal notifies an occurrence of an error to the exception notification controller.

9. The data processing device according to claim 1, wherein the peripheral device comprises a program storage to store a program used in a processing performed in the computing circuit, and the computing circuit refers to the program when the computing circuit executes the exception processing.

10. The data processing device according to claim 1, wherein when an authority status indicates a task executing the exception processing, the bus disablement controller instructs the internal bus connection circuit to cancel the disablement of the access from the computing circuit to the internal bus.

11. A method for bus access control of a data processing device comprising an internal bus, a computing circuit that accesses a peripheral device connected to the internal bus, and an internal bus connection circuit that is provided between the computing circuit and the internal bus and that selectively switches an enable state and a disable state of an access from the computing circuit to the internal bus, the method comprising:
disabling an access from the computing circuit to the internal bus based on an access violation in the peripheral device;
canceling the disabling of the access from the computing circuit to the internal bus in accordance with a start of an exception processing in the computing circuit, and
starting the exception processing by retrieving an exception processing program stored in the peripheral device through the internal bus for the computing circuit.

12. The method for bus access control of a data processing device according to claim 11, wherein:
the disabling the access comprises disabling the access from the computing circuit to the internal bus in accordance with an exception occurrence notification signal input to the computing circuit based on the access violation in the peripheral device; and
the canceling the disabling of the access comprises canceling the disabling of the access from the computing circuit to the internal bus in accordance with a start of an exception processing based on the exception occurrence notification signal in the computing circuit.

13. The method for bus access control of a data processing device according to claim 11, wherein:
the disabling the access comprises disabling the access to the internal bus by a set signal, the set signal instructing to disable the access from the computing circuit to the internal bus and being output based on an exception occurrence notification signal;

the canceling the disabling of the access comprises canceling the disabling of the access by a clear signal; and the clear signal instructing to cancel the disabling of the access from the computing circuit to the internal bus and being output in accordance with the start of an exception processing based on the exception occurrence notification signal in the computing circuit.

14. The method for bus access control of a data processing device according to claim 11, further comprising:

performing an emergency interruption request to an instruction executing part of the computing circuit in accordance with emergency interruption notification signal, the emergency interruption notification signal notifying an occurrence of an emergency interruption processing having a higher priority than the exception processing;

canceling the disabling of the access, in a case where the internal bus connection circuit disables the access in performing an emergency interruption request; and disabling the access, in accordance with a completion of an emergency interruption processing in the instruction executing part.

15. The method for bus access control of a data processing device according to claim 11, further comprising:

instructing, in a period when the internal bus connection circuit is instructed to disable the access from the computing circuit to the internal bus by the set signal based on an exception occurrence notification signal, the internal bus connection circuit to cancel the disabling of the access from the computing circuit to the internal bus, in a case where an authority status shows an emergency interruption processing, the authority status shows an operation authority of a task which is in execution in the computing circuit, and a priority of the emergency interruption processing is higher than that of the exception processing, and instructing the internal bus connection circuit to disable the access from the computing circuit to the internal bus in accordance with a completion of an emergency interruption processing.

16. The method for bus access control of a data processing. device according to claim 11, wherein the canceling the disabling of the access comprises canceling the disabling of the access from the computing circuit to the internal bus, in a case where an authority status shows an execution of the exception processing, the authority status showing an operation authority of a task which is in execution in the computing circuit.

17. The method for bus access control of a data processing device according to claim 11, further comprising: sending a response back to the computing circuit temporarily in accordance with the access to the internal bus from the computing circuit during a period of disabling the access from the computing circuit to the internal bus.

18. The method for bus access control of a data processing device according to claim 11, wherein the disabling the access from the computing circuit to the internal bus in accordance with an exception occurrence notification signal comprises determining whether the data processing device outputs the exception occurrence notification to the computing circuit based on a priority of a flag stored in a flag group storage storing kinds of errors generated in the peripheral device.

19. The method for bus access control of a data processing device according to claim 11, further comprising: controlling whether the data processing device notifies an occurrence of an error to the computing circuit in accordance with a seriousness of information of the error occurred in an access to an internal peripheral device, the internal peripheral device including a predetermined function and being included in the peripheral device.

20. The method for bus access control of a data processing device according to claim 11, further comprising: referring to a program storage when the computing circuit executes the exception processing, the program storage storing programs used for each processing.

21. The method for bus access control of the data processing device according to claim 11, wherein when a task executes the exception processing, the bus disablement controller instructs the internal bus connection circuit to cancel the disablement of the access from the computing circuit to the internal bus.

* * * * *